(12) United States Patent
DeVore et al.

(10) Patent No.: US 12,003,272 B2
(45) Date of Patent: Jun. 4, 2024

(54) TIMING MEASUREMENT APPARATUS

(71) Applicant: Lawrence Livermore National Security, LLC, Livermore, CA (US)

(72) Inventors: Peter Thomas Setsuda DeVore, Livermore, CA (US); Apurva Shantharaj Gowda, Mountain View, CA (US); David Simon Perlmutter, Oakland, CA (US); Joshua Linne Olson, Manassas, VA (US); Jason Thomas Chou, Walnut Creek, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 80 days.

(21) Appl. No.: 17/667,999

(22) Filed: Feb. 9, 2022

(65) Prior Publication Data

US 2022/0231760 A1 Jul. 21, 2022

Related U.S. Application Data

(63) Continuation of application No. 16/898,218, filed on Jun. 10, 2020, now Pat. No. 11,444,690.
(Continued)

(51) Int. Cl.
*H04B 10/079* (2013.01)
*H04B 10/2575* (2013.01)

(52) U.S. Cl.
CPC ..... *H04B 10/0795* (2013.01); *H04B 10/2575* (2013.01)

(58) Field of Classification Search
CPC .. G02B 5/20; H04B 10/0795; H04B 10/2575; H04B 10/61; H04B 10/60;
(Continued)

(56) References Cited

U.S. PATENT DOCUMENTS

| 4,709,978 A | 12/1987 | Jackel |
| 5,148,503 A | 9/1992 | Skeie |

(Continued)

FOREIGN PATENT DOCUMENTS

| EP | 4000230 A1 | 5/2022 |
| JP | 2001053684 A | 2/2001 |

(Continued)

OTHER PUBLICATIONS

Abo, M., A., et al., "A 1.5-V, 10-bit, 14.3-MS/s CMOS Pipeline Analog-to-Digital Converter," IEEE Journal of Solid-State Circuits, vol. 34, No. 5, May 1999.
(Continued)

*Primary Examiner* — Hibret A Woldekidan
(74) *Attorney, Agent, or Firm* — Perkins Coie LLP

(57) ABSTRACT

Methods, devices and systems for providing accurate measurements of timing errors using optical techniques are described. An example timing measurement device includes an optical hybrid that receives two optical pulse trains and produces two or more phase shifted optical outputs. The timing measurement device further includes two or more optical filters that receive the outputs of the optical hybrid to produce multiple pulse signals with distinctive frequency bands. The device also includes one or more photodetectors and analog-to-digital converters to receive to produce electrical signals in the digital domain corresponding to the optical outputs of the hybrid. A timing error associated with the optical pulse trains can be determined using the electrical signals in digital domain based on a computed phase difference between a first frequency band signal and a second frequency band signal and a computed frequency difference between the first frequency band signal and the second frequency band.

20 Claims, 16 Drawing Sheets

Related U.S. Application Data

(60) Provisional application No. 62/875,429, filed on Jul. 17, 2019.

(58) Field of Classification Search
CPC .............. H04B 10/6165; H04B 10/614; H04B 10/613; H04B 10/67; H04B 10/616; H04B 10/65; H04B 10/6161; H04B 10/508; H04B 10/07951; H04B 10/07953; H04B 10/07955; H04B 10/07957; H04B 10/2557; H04J 14/02
USPC .............................. 398/25, 29, 202, 208, 209
See application file for complete search history.

(56) References Cited

U.S. PATENT DOCUMENTS

| | | | |
|---|---|---|---|
| 5,249,243 | A | 9/1993 | Skeie |
| 5,339,185 | A | 8/1994 | Kaede |
| 5,408,544 | A | 4/1995 | Seino |
| 5,627,637 | A | 5/1997 | Kapteyn |
| 6,259,552 | B1 | 7/2001 | Boffi et al. |
| 6,339,489 | B1 | 1/2002 | Bruyere et al. |
| 6,462,844 | B1 | 10/2002 | Kai et al. |
| 6,661,975 | B1 | 12/2003 | Hall et al. |
| 6,671,298 | B1 | 12/2003 | Delfyett et al. |
| 6,724,783 | B2 | 4/2004 | Jalali et al. |
| 6,738,181 | B1 | 5/2004 | Nakamoto et al. |
| 6,744,553 | B1 | 6/2004 | Islam et al. |
| 7,133,135 | B2 | 11/2006 | Dorrer |
| 7,209,664 | B1 | 4/2007 | Mcnicol et al. |
| 7,259,901 | B2 | 8/2007 | Parsons et al. |
| 7,352,504 | B2 | 4/2008 | Hirooka et al. |
| 7,391,969 | B2 | 6/2008 | Shpantzer et al. |
| 7,522,842 | B1 | 4/2009 | Mcnicol et al. |
| 7,587,144 | B2 | 9/2009 | Ilchenko et al. |
| 7,643,212 | B1 | 1/2010 | Sokoloff et al. |
| 7,787,779 | B2 | 8/2010 | Weiner et al. |
| 7,868,799 | B1 | 1/2011 | Price et al. |
| 7,877,020 | B1 | 1/2011 | Hayes et al. |
| 7,940,380 | B1 | 5/2011 | Benner |
| 8,164,819 | B2 | 4/2012 | Tu et al. |
| 8,442,402 | B1 | 5/2013 | Zanoni et al. |
| 8,446,305 | B1 | 5/2013 | Zanoni et al. |
| 8,456,336 | B1 | 6/2013 | Zanoni et al. |
| 8,478,132 | B1 | 7/2013 | Jepsen et al. |
| 8,503,887 | B2 | 8/2013 | Kikuchi |
| 8,548,331 | B1 | 10/2013 | Zanoni et al. |
| 8,779,955 | B1 | 7/2014 | Zanoni et al. |
| 8,909,061 | B1 | 12/2014 | Varadarajan |
| 8,934,058 | B2 | 1/2015 | Chou et al. |
| 8,965,211 | B1 | 2/2015 | Zanoni et al. |
| 9,077,455 | B2 | 7/2015 | Randel et al. |
| 9,118,423 | B1 | 8/2015 | Zanoni et al. |
| 9,197,471 | B1 | 11/2015 | Zanoni et al. |
| 9,356,704 | B1 | 5/2016 | Zanoni et al. |
| 9,645,291 | B1 | 5/2017 | Sommer et al. |
| 9,843,398 | B1 | 12/2017 | Zanoni et al. |
| 9,857,660 | B1 | 1/2018 | Devore et al. |
| 9,888,303 | B1 | 2/2018 | Jepsen et al. |
| 10,063,320 | B2 | 8/2018 | Clark et al. |
| 10,069,619 | B1 | 9/2018 | Zanoni et al. |
| 10,075,154 | B1 | 9/2018 | Hsieh |
| 10,139,704 | B1* | 11/2018 | Shamee .................. H03M 1/12 |
| 11,184,087 | B2 | 11/2021 | Buckley et al. |
| 2001/0046077 | A1 | 11/2001 | Akiyama et al. |
| 2002/0167721 | A1 | 11/2002 | Caplan |
| 2002/0176152 | A1 | 11/2002 | Parolari et al. |
| 2003/0016439 | A1 | 1/2003 | Courtois et al. |
| 2003/0058499 | A1 | 3/2003 | Reingand et al. |
| 2003/0175037 | A1 | 9/2003 | Kimmitt et al. |
| 2004/0004780 | A1 | 1/2004 | Watanabe |
| 2004/0085620 | A1 | 5/2004 | Kawanishi et al. |
| 2006/0127004 | A1 | 6/2006 | Waters |
| 2007/0070493 | A1 | 3/2007 | Kim et al. |
| 2007/0133918 | A1 | 6/2007 | Cho et al. |
| 2007/0140705 | A1* | 6/2007 | Shpantzer .......... H04B 10/2543 398/189 |
| 2007/0273958 | A1* | 11/2007 | Hirooka ................. G01J 11/00 359/327 |
| 2008/0212166 | A1 | 9/2008 | Lett et al. |
| 2008/0285977 | A1 | 11/2008 | Caplan |
| 2009/0142070 | A1 | 6/2009 | Boduch et al. |
| 2010/0209121 | A1 | 8/2010 | Tanimura |
| 2011/0064411 | A1 | 3/2011 | Eiselt |
| 2011/0097085 | A1 | 4/2011 | Oda et al. |
| 2011/0129230 | A1 | 6/2011 | Zanoni et al. |
| 2011/0141478 | A1 | 6/2011 | Sasaki et al. |
| 2011/0150478 | A1 | 6/2011 | Winzer |
| 2012/0069854 | A1 | 3/2012 | Suzuki |
| 2012/0134667 | A1 | 5/2012 | Westlund et al. |
| 2012/0148264 | A1 | 6/2012 | Liu et al. |
| 2012/0212360 | A1 | 8/2012 | Kanter et al. |
| 2012/0213532 | A1 | 8/2012 | Hironishi et al. |
| 2012/0251031 | A1 | 10/2012 | Suarez et al. |
| 2012/0263456 | A1 | 10/2012 | Tanaka et al. |
| 2012/0274937 | A1 | 11/2012 | Hays et al. |
| 2012/0288286 | A1 | 11/2012 | Houtsma et al. |
| 2013/0062508 | A1 | 3/2013 | Kanter et al. |
| 2013/0209089 | A1 | 8/2013 | Harley et al. |
| 2013/0315597 | A1 | 11/2013 | Shaver et al. |
| 2014/0233963 | A1 | 8/2014 | Le Taillandier De Gabory |
| 2015/0016827 | A1 | 1/2015 | Wilkinson et al. |
| 2015/0110494 | A1 | 4/2015 | Ghelfi et al. |
| 2015/0207567 | A1 | 7/2015 | Bogoni et al. |
| 2015/0341121 | A1 | 11/2015 | Yue et al. |
| 2016/0248515 | A1 | 8/2016 | Zheng et al. |
| 2017/0250776 | A1 | 8/2017 | Morsy-osman et al. |
| 2018/0006730 | A1 | 1/2018 | Kuo et al. |
| 2018/0034550 | A1 | 2/2018 | Rakich et al. |
| 2018/0209851 | A1* | 7/2018 | Bartels ...................... G01J 3/26 |
| 2018/0294946 | A1 | 10/2018 | Sinclair et al. |
| 2019/0041267 | A1 | 2/2019 | Burghoff et al. |
| 2019/0072833 | A1 | 3/2019 | Nejadriahi et al. |
| 2019/0097734 | A1 | 3/2019 | Inagaki et al. |
| 2019/0187198 | A1 | 6/2019 | Anderson et al. |
| 2019/0199443 | A1 | 6/2019 | Zamani et al. |
| 2020/0150346 | A1 | 5/2020 | Cavaliere et al. |
| 2020/0295838 | A1 | 9/2020 | Gordon et al. |
| 2021/0021914 | A1 | 1/2021 | Perlmutter et al. |
| 2021/0044253 | A1 | 2/2021 | Chao et al. |
| 2022/0085887 | A1 | 3/2022 | Buckley et al. |
| 2022/0100047 | A1 | 3/2022 | Gowda et al. |
| 2022/0231760 | A1 | 7/2022 | Devore et al. |
| 2023/0163850 | A1 | 5/2023 | Buckley et al. |

FOREIGN PATENT DOCUMENTS

| | | |
|---|---|---|
| JP | 2008141689 A | 6/2008 |
| WO | 2007112449 A2 | 10/2007 |
| WO | 2010059257 A1 | 5/2010 |
| WO | 2017030532 A1 | 2/2017 |
| WO | 2018059338 A1 | 4/2018 |

OTHER PUBLICATIONS

Bao, X., et al., "Recent Progress in Distributed Fiberoptic Sensors," Sensors 2012, 12, 8601-8639.

Batagelj, B., et al., "Key Properties and Design Issues for an Opto-Electronic Oscillator," ICTON 2015.

Burns, K., W., et al., "Second Harmonic Generation in Field Poled, Quasi-Phase-Matched, Bulk LiNbO3," IEEE Photonics Technology Letters, vol. 6. No. 2, Feb. 1994.

Chen, Y., K., et al., "Integrated Photonic Digital-to-Analog Converter for Arbitrary Waveform Generation," Bell Laboratories, Alcatel-Lucent, 600 Mountain Avenue, New Jersey, U.S.A.

Davari, B., et al., "CMOS Scaling for High Performance and Low Power—The Next Ten Years," Proceedings of the IEEE, vol. 83, No. 4, Apr. 1995.

De La Rosa, E., et al., "All-fiber absolute temperature sensor using an unbalanced high-birefringence Sagnac loop," Optics Letters, vol. 22, No. 7, Apr. 1, 1997.

(56) References Cited

OTHER PUBLICATIONS

Devore, S.,T., P., et al., "Enhancing electrooptic modulators using modulation instability," Phys. Status Solidi RRL 7, No. 8 (2013).
Devore, S.,T., P., et al., "Light-weight flexible magnetic shields for large-aperture photomultiplier tubes," Nuclear Instruments and Methods in Physics Research A 737(2014) 222-228.
Devore, S., T., P., et al., "Near-field and complex-field time-stretch transform," Proc. of SPIE vol. 9141.
Devore, S., T., P., et al., "Rogue events and noise shaping in nonlinear silicon photonics," Journal of Optics 15, 2013.
Devore, S., T., P., et al., "Stimulated supercontinuum generation extends broadening limits in silicon," Appl. Phys. Lett. 100, 101111 (2012).
Devore, S., T., P., et al., Coherent Time-Stretch Transform for Near-Field Spectroscopy, IEEE Photonics Journal, vol. 6, No. 2, Apr. 2014.
Dumin, J., D., et al., "Oxide Wearout, Breakdown, and Reliability," International Journal of High Speed Electronics and Systems, vol. 11, No. 3 (2001) 617-718.
Eickhoff, W., "Temperature sensing by mode-mode interference in birefringent optical fibers," Optics Letters, vol. 6, No. 4, Apr. 1981.
Eliyahu, D., et al., "Tunable, Ultra-Low Phase Noise YIG Based Opto-Electronic Oscillator," IEEE MTT-S Digest, 2003.
Fard, M., A., et al.,"Impact of Optical Nonlinearity on Performance of Photonic Time-Stretch Analog-to-Digital Converter," Journal of Lightwave Technology, vol. 29, No. 13, Jul. 1, 2011.
Fortier, M., T., "Generation of ultrastable microwaves via optical frequency division," Nature Photonics, vol. 5, Jul. 2011.
Fortier, M., T., et al., "Optically referenced broadband electronic synthesizer with 15 digits of resolution," Laser Photonics Rev. 10, No. 5, 780-790 (2016).
Gee, M., C., et al., "Spurious-Free Dynamic Range of a High-Resolution Photonic Time-Stretch Analog-To-Digital Converter System," Microwave and Optical Technology Letters, vol. 54, No. 11, Nov. 2012.
Gee, M., C., et al., Spurious-Free Dynamic Range of a High-Speed Photonic Time-Stretch A/D-Converter System, Advanced Photonics Congress © 2012.
Gregers-Hansen, V., et al., "A Stacked A-to-D Converter for Increased Radar Signal Processor Dynamic Range," Radar Division, Naval Research Laboratory Washington, DC 20375.
Ikeda, K., et al., "Optical quantizing and coding for ultrafast A/D conversion using nonlinear fiber-optic switches based on Sagnac interferometer," May 30, 2005, vol. 13, No. 11, Optics Express 4297.
International Searching Authority, International Search Report and Written Opinion, PCT Patent Application PCT/US/2020/042664, dated Oct. 4, 2020, 8 pages.
International Searching Authority, International Search Report and Written Opinion, PCT Patent Application PCT/US2020/042422, dated Nov. 17, 2020, 8 pages.
International Searching Authority, International Search Report and Written Opinion, PCT Patent Application PCT/US2020/042425, dated Nov. 4, 2020, 7 pages.
International Searching Authority, International Search Report and Written Opinion, PCT Patent Application PCT/US2020/042649, dated Nov. 18, 2020, 10 pages.
International Searching Authority, International Search Report and Written Opinion, PCT Patent Application PCT/US2020/045336, dated Mar. 10, 2021, 8 pages.
Jiang, Y., et al., "Analog optical computing primitives in silicon photonics,"Optics Letters, vol. 41, No. 6, Mar. 2016.
Jung, K., et al., "All-fibre photonic signal generator for attosecond timing and ultralow-noise microwave," Scientific Reports, 5: 16250, DOI: 10.1038/srep16250.
Juodawlkis, W., P., et al., "Optically Sampled Analog-to-Digital Converters," IEEE Transactions on Microwave Theory and Techniques, vol. 49, No. 10, Oct. 2001.
Kazovsky, "All-fiber 900 optical hybrid for coherent communications." Applied Optics, vol. 26, No. 3, Feb. 1987.
Kim., H., et al., "Sub-20-Attosecond Timing Jitter Mode-Locked Fiber Lasers," IEEE Journal of Selected Topics In Quantum Electronics, vol. 20, No. 5, Sep./Oct. 2014.
Kitayama, K, et al., "Ultrafast All-Optical Analog-to-Digital Conversion using Fiber Nonlinearity," ECOC 2009, Sep. 20-24, 2009, Vienna, Austria.
Liao, J., et al., "Novel Photonic Radio-frequency Arbitrary Waveform Generation based on Photonic Digital-to-Analog Conversion with Pulse Carving," Department of Electronic Engineering, Tsinghua University, Beijing, I 00084, China.
Linde, D., et al., "Characterization of the Noise in Continuously Operating Mode-Locked Lasers," Appl. Phys. B 39, 201-217 (1986).
Luennemann, M., et al., "Electrooptic properties of lithium niobate crystals for extremely high external electric fields," Appl. Phys. B 76, 403-406 (2003).
Miyoshi, Y., et al., "Multiperiod PM-NOLM With Dynamic Counter-Propagating Effects Compensation for 5-Bit All-Optical Analog-to-Digital Conversion and Its Performance Evaluations," Journal of Lightwave Technology, vol. 28, No. 4, Feb. 15, 2010.
Miyoshi, Y., et al., "Performance Evaluation of Resolution-Enhanced ADC Using Optical Multiperiod Transfer Functions of NOLMs," IEEE Journal of Selected Topics in Quantum Electronics, vol. 18, No. 2, Mar./Apr. 2012.
Moazzami, R., et al., "Projecting Gate Oxide Reliability and Optimizing Reliability Screens," IEEE Transactions on Electron Devices. vol. 37. No. 7. Jul. 1990.
Reilly, R., D., et al., "Undersampling a photonic analog-to-digital converter containing an optical hybrid combiner," Optics Communications 288 (2013) 31-37.
Robinson, R., "Polarization modulation and splicing techniques for stressed birefringent fiber," Rochester Institute of Technology RIT Scholar Works, Thesis/Dissertation Collections, Jan. 1995.
Rodwell, W., J., M., et al., "Subpicosecond Laser Timing Stabilization," IEEE Journal of Quantum Electronics, vol. 25, No. 4. Apr. 1989.
Sherman, A., et al., "Optical under-sampling by using a broadband optical comb with a high average power," Optical Society of America, Jun. 2014, vol. 22.
Wei, J., et al., "All-fiber-photonics-based ultralow-noise agile frequency synthesizer for X-band radars," vol. 6, No. 1 / Jan. 2018 / Photonics Research.
Xiao, J., et al., "High-Frequency Photonic Vector Signal Generation Employing a Single Phase Modulator," IEEE Photonics Journal, vol. 7, No. 2, Apr. 2015.
Xie, X., et al., "Photonic microwave signals with zeptosecond-level absolute timing noise," Nature Photonics, vol. 11, Jan. 2017.
Yao, S., X., et al., "Converting light into spectrally pure microwave oscillation," Optics Letters, vol. 21, No. 7, Apr. 1996.
Yao, S., X., et al., "Optoelectronic Oscillator for Photonic Systems," IEEE Journal of Quantum Electronics, vol. 32, No. 7, Jul. 1996.
Zhou, D., et al., "Single-shotBOTDA based on an optical chirp chain probe wave for distributed ultrafast measurement," Light: Science & Applications (2018) 7:32, Official journal of the CIOMP 2047-7538.
Zou, W., et al., "One-laser-based generation/detection of Brillouin dynamic grating and its application to distributed discrimination of strain and temperature," Optics Express 2363, vol. 19, No. 3, Jan. 2011.
Stern, Liron, et al., "Controlling the interactions of space-variant polarization beams with rubidium vapor using external magnetic fields," Optics Express, vol. 24, No. 5, 2016.
Chen, Ying, et al., "Sub-Nyquist Sampled Analog-to-Digital Conversion Based on Photonic Time Stretch and Compressive Sensing with Optical Random Mixing," Journal of Lightwave Technology vol. 31, No. 21, p. 3395-3401, 2013.
Extended European Search Report dated Jul. 10, 2023 for European Patent Application No. 20840963.1.
Extended European Search Report dated Jul. 11, 2023 for European Patent Application No. 20840844.3.
Extended European Search Report dated Jul. 18, 2023 for European Patent Application No. 20844606.2.

(56) References Cited

OTHER PUBLICATIONS

Han, Yan, et al., "Photonic Time-Stretched Analog-to-Digital Converter: Fundamental Concepts and Practical Considerations," Journal of Lightwave Technology, vol. 21, No. 12, 2003, pp. 3085-3103.
Valley, George C., "Photonic analog-to-digital converters," Optics Express vol. 15, No. 5, 2007, pp. 1955-1982.
Xie, Xinggang, et al., "Photonic Time-Stretch Analog-to-Digital Converter Employing Phase-Modulation and Envelope Removing," Proc. of SPIE vol. 9043, 2013.

* cited by examiner

TIMING MEASUREMENT APPARATUS

CROSS-REFERENCE TO RELATED APPLICATIONS

This patent document is a continuation application of U.S. Non-Provisional patent application Ser. No. 16/898,218, entitled "TIMING MEASUREMENT APPARATUS," filed on Jun. 10, 2020, which claims priority to and benefits of U.S. Provisional Patent Application No. 62/875,429, entitled "TIMING MEASUREMENT APPARATUS," filed on Jul. 17, 2019. The entire contents of the before-mentioned patent applications are incorporated by reference as part of the disclosure of this patent document.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Generating microwave signals with high spectral purity and stability is crucial in communication systems, radars, signal processing, radio astronomy, satellites, GPS navigation, spectroscopy, and in time and frequency metrology. Optical frequency combs can achieve a phase noise that is orders of magnitude lower than what is available from commercial microwave references. Thus, they have become revolutionary tools in high-precision applications, such as low phase noise microwave oscillators and generators, low sample timing error of high frequency microwaves and millimeter waves, photonic analog-to-digital converters, photonics-based radars, dual-comb ranging, timing synchronization and distribution, and alike. However, all free-running optical frequency combs exhibit high phase noise at various timescales.

SUMMARY

The disclosed techniques can be implemented in various embodiments to obtain an accurate measurement of timing errors to generate a frequency agile radio-frequency (RF) signal. The disclosed embodiments, among other features and benefits, allow the timing information to be recorded in digital form for subsequent compensation or processing and allow timing error information to be obtained and utilized in real time.

One aspect of the disclosed embodiments relates to a timing measurement device that includes an optical hybrid configured to receive two optical pulse trains as inputs and produce two or more optical outputs that are each phase shifted with respect to one another. The timing measurement device further includes two or more optical filters each coupled to the optical hybrid to receive an output from the optical hybrid, the two or more optical filters configured to produce multiple pulse signals with distinctive frequency bands. The timing measurement device also includes one or more photodetectors positioned to receive and convert each of the multiple optical signals produced by the two or more optical filters to an associated electrical signal. The timing measurement device additionally includes one or more analog-to-digital converters coupled to the one or more photodetectors to convert the plurality of electrical signals into a plurality of digital signals corresponding to the outputs of the two or more optical filters, where processing of the plurality of digital signals enables a determination of a timing error associated with the two optical pulse trains based on a computed phase difference between a first frequency band signal and a second frequency band signal and a computed frequency difference between the first frequency band signal and the second frequency band.

DETAILED DESCRIPTION

Timing variations or irregularity of the optical pulse trains, such as jitter, become important properties for optical frequency comb applications. For example, the general approach to remove or reduce jitter from an optical pulse train in an RF signal generator is to measure the jitter of an optical pulse train as accurately as possible, use that jitter information to correct its effects as precisely as possible, and use that jitter corrected signal to make a very low jitter RF signal generator. However, existing techniques that use an electronic reference can be limited by the poor high frequency offset phase noise of electronic references. Techniques that use an optical reference can be limited by the poor low frequency offset phase noise of optical references. Techniques that use a stabilized continuous-wave reference require ultrahigh quadrature cavities which are extremely fragile and temperature and/or vibration sensitive. Some of the conventional techniques also require multi-staged phase-locked loops for both the repetition rate and the carrier-envelope offset, or complicated subsystems that perform spectral broadening and carrier-envelope offset control.

Many conventional techniques are limited by environmental sensitivity, such as temperature or vibrations through various physical mechanisms. In rougher environments, the amount of requisite isolation increases, posing more challenges to the size and weight of the system. Furthermore, many conventional techniques measures timing irregularities (such as jitter) using an averaging instrument (e.g., an RF spectrum analyzer). However, temporal dependence of the timing error information is lost during averaging, so this information cannot be used to correct the error in real-time. It is thus desirable to obtain a real-time timing error measurement so as to create a signal generator that is more stable.

The techniques disclosed herein, among other features and benefits, overcome the above limitations and rely in-part on a digitally corrected optical delay reference. The disclosed embodiments enable precise measurements of timing errors in signals using optical techniques. The example timing error measurements described herein, by the way of example and not by limitation, sometimes refer to jitter measurements. It should be understood, however, that the disclosed embodiments are applicable to measuring all types of timing errors, and can be specially beneficial in applications where real-time timing error measurements on a pulse-by-pulse basis is needed for in-situ correction or optimization of signal generation or processing systems.

Figures 1A, 1B, 1C:
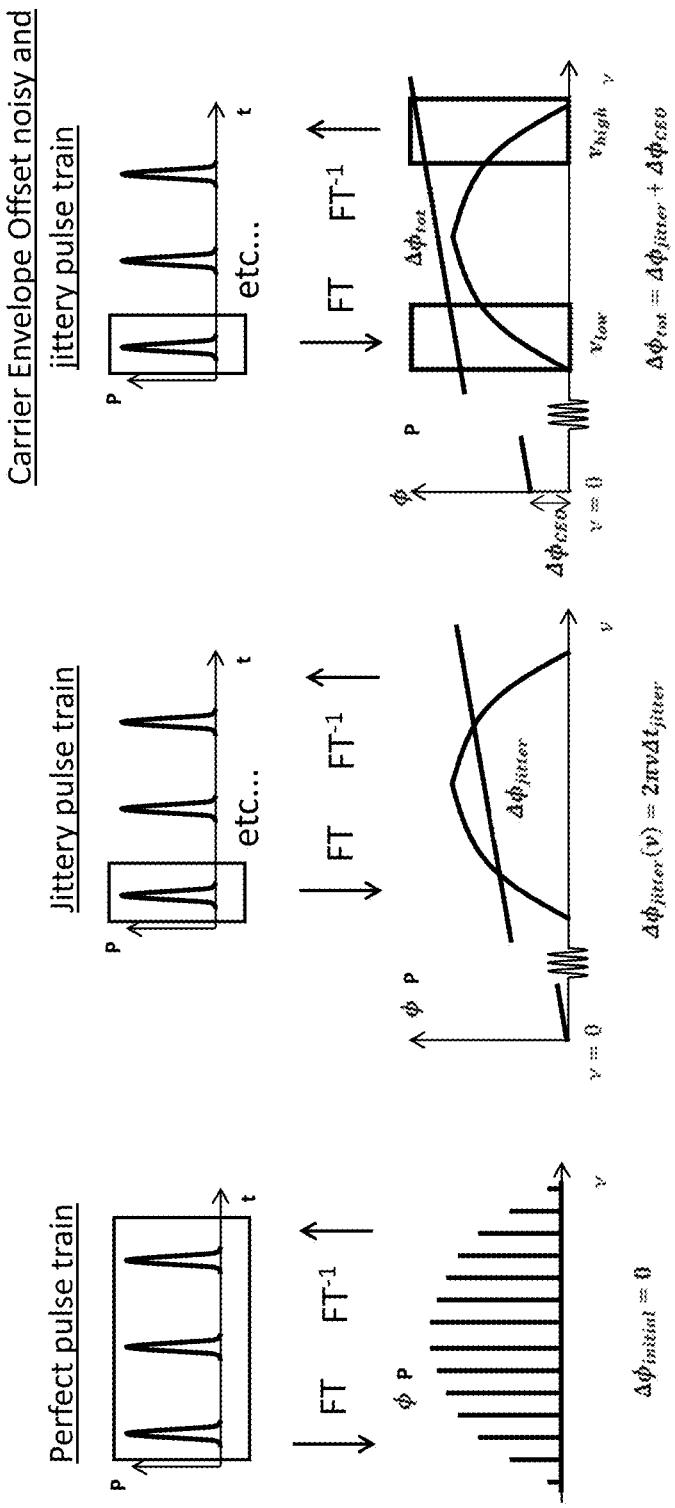
FIG. 1A illustrates a perfect pulse train and its associated optical spectrum.
FIG. 1B illustrates an example phase offset caused by jitter in the pulse train.
FIG. 1C illustrates an example phase offset caused by both jitter and carrier envelope offset.

The concept of the digitally corrected delay reference is illustrated using jitter measurements as an example. FIGS. 1A-1C illustrate schematic diagrams of performing jitter measurements. When the pulse has a specific timing component, the pulse demonstrates a phase slope associated with the timing. FIG. 1A illustrates a perfect pulse train and its associated optical spectrum. The initial phase slope in this particular example is 0. In addition to the phase slope, there is also a phase offset caused by any irregularities in the timing component. FIG. 1B illustrates an example phase offset caused by jitter in the pulse train. Furthermore, the phase offset is also related to the carrier envelope offset (CEO) phase. This is the phase of the optical pulse carrier, which can vary independently from the timing of the pulse itself. FIG. 1C illustrates an example phase offset caused by both jitter and carrier envelope offset. When two pulses interfere with each other, the spectral interference pattern encodes the phase differences in the intensity pattern. Given two phase offsets $\Delta\emptyset_{high}$ and $\Delta\emptyset_{low}$ measured at different frequencies, $v_{high}$ and $v_{low}$, respectively, the phase offset caused by carrier envelope offset $\Delta\emptyset_{CEO}$ can be eliminated ac follows:

$$\Delta\emptyset_{high} - \Delta\emptyset_{low} = (2\pi v_{high} t_{jitter} + \Delta\emptyset_{CEO}) - (2\pi v_{low} t_{jitter} + \Delta\emptyset_{CEO}) \quad \text{Eq. (1)}$$

$$= 2\pi(v_{high} - v_{low})t_{jitter} \quad \text{Eq. (2)}$$

The phase offset caused by jitter can then be determined as:

$$\Delta t_{jitter} = \frac{(\Delta\emptyset_{high} - \Delta\emptyset_{low})}{2\pi(v_{high} - v_{low})} \quad \text{Eq. (3)}$$

The different frequency values $v_{high}$ and $v_{low}$ can be selected using different optical filters. An optical filter is a device that takes in an optical wave and outputs that optical wave with some wavelengths of the spectrum with lower output power than others. For example, an optical filter can pass a contiguous fraction of the input bandwidth, with each of the optical filters passing a different band of wavelengths, e.g., arrayed waveguide gratings, thin-film filters, or fiber Bragg gratings. Many optical filters have multiple outputs, each corresponding to a distinct frequency band of the input. In this document, optical filters are also referred as wavelength division multiplexers (WDMs). In addition to arrayed waveguide gratings and thin-film filters, they can be constructed in multiple ways, including but not limited to: a coupler followed by single output filters on each output, a set of reflective filters can be combined with circulator, such that the reflection from one filter is circulated to the next filter. The filters can be selected so that they can cover the optical spectrum of the pulse train while maintaining sufficient separation of the frequencies. Phase offsets caused by other types of timing variations or irregularities can be determined in a similar fashion.

Figure 2A:
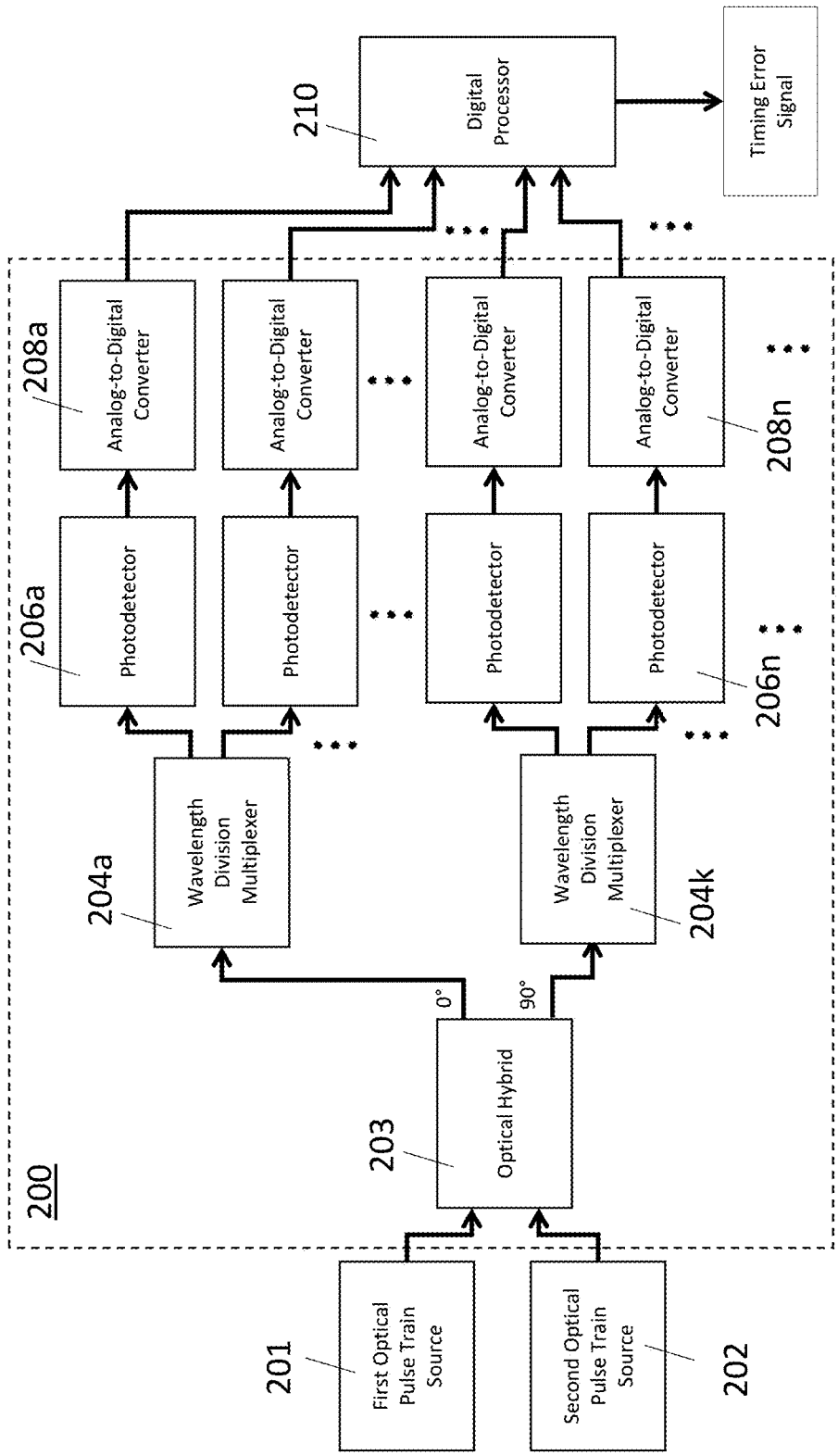
FIG. 2A illustrates an example timing measurement apparatus in accordance with the present technology.

FIG. 2A illustrates an example timing measurement apparatus 200 in accordance with the present technology. The apparatus 200 accepts two inputs 210, 202 into an optical hybrid 203 device. The optical hybrid 203 is a device that can include a number of beam splitters and one or more quarter-wave plates. The optical hybrid 203 includes at least two inputs and at least two outputs such that the two inputs are interfered at each output, with a phase difference between the inputs that is different for each output. For example, the device can produce 0 and 90-degree phase difference outputs, or 0, 90, 180, and 270-degree outputs. In some embodiments, the phase difference between the outputs can have values other than 90°.

In this embodiment, the optical hybrid 203 generates two outputs whose phases are shifted 90 degrees from each other (e.g., 0° and 90° outputs). The two outputs of the optical hybrid 203 are fed into wavelength division multiplexers 204a to 204k (e.g., optical filters). The outputs of each wavelength division multiplexer (e.g., $v_{high}$ and $v_{low}$) are fed into photodetectors 206a to 206n to convert the optical signals into radio-frequency (RF) signals. The RF outputs from the photodetectors 206a to 206n are then digitized using analog-to-digital converters 208a to 208n. The digital signals output from the timing measurement apparatus can be fed into a digital processor 210 to calculate a pulse pair phase difference at each wavelength. In some embodiments, the digital processor 210 is a part of the timing measurement apparatus 200. It should be noted that in FIG. 2A, and other figures herein, the depicted ellipses indicate the capability of processing two or more wavelength channels using similar configurations.

In general, at least some of the components in FIG. 2A (as well as other figures in this patent document) can be implemented as part of the timing measurement device, or as separate components and/or at remote locations with respect to other components of the system. For example, in some embodiments, the digital processor is a separate component implemented outside of the timing measurement apparatus. Similarly, the analog-to-digital converters or even, in some instances, the photodetectors can be implemented as separated components.

Figure 2B:
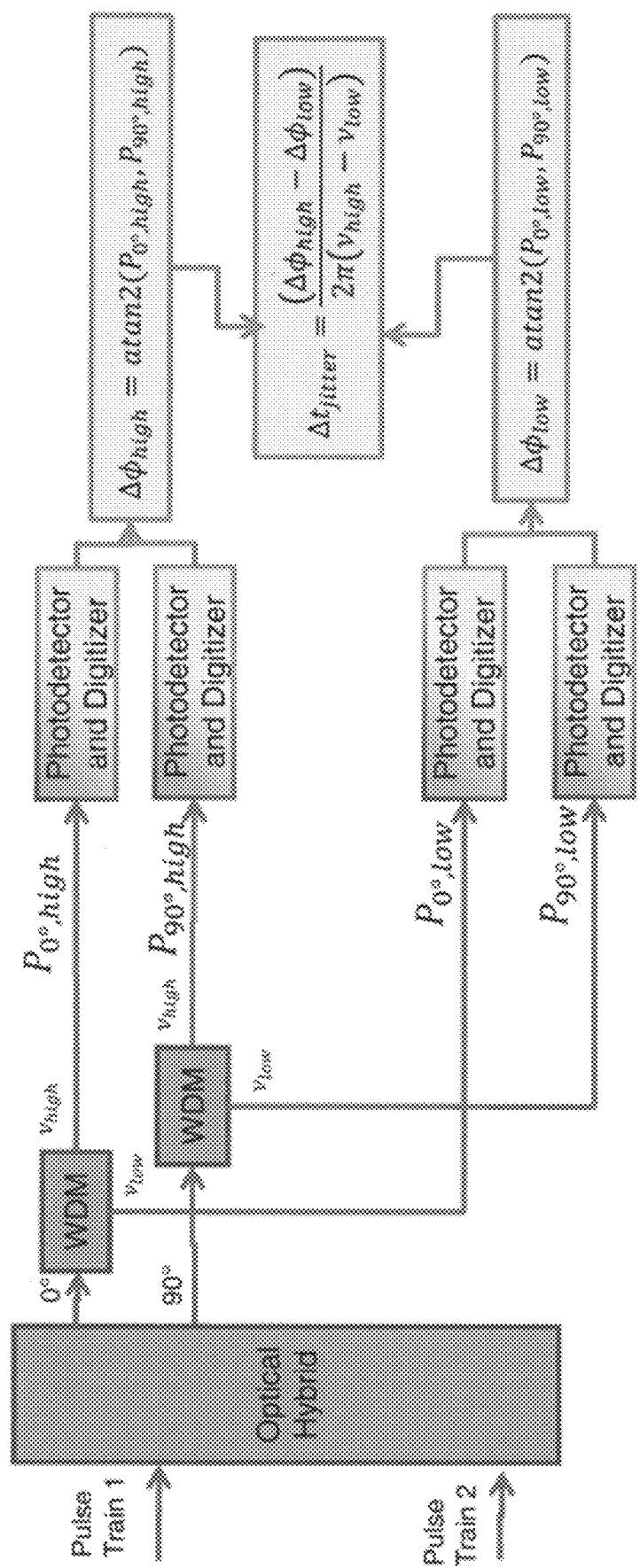
FIG. 2B illustrates another representation of the timing measurement apparatus in accordance with an example embodiment.

FIG. 2B illustrates another representation of the timing measurement apparatus in accordance with the present technology to provide better understanding of the phase offset calculations. The phase offset $\Delta\varnothing_{high}$ can be obtained as:

$$\Delta\varnothing_{high} = \alpha \tan 2(P_{0°,high}, P_{90°,high}) \qquad \text{Eq. (4)}$$

The phase offset $\Delta\varnothing_{low}$ can be obtained as:

$$\Delta\varnothing_{low} = \alpha \tan 2(P_{0°,low}, P_{90°,low}) \qquad \text{Eq. (5)}$$

The phase offset caused by timing error (e.g., jitter) can then be determined according to Eq. (3). As shown in Eq. (3), the pulse pair phase differences at each wavelength for the same original pulse are subtracted to eliminate the carrier envelope offset phase. The result can be scaled by the optical frequency difference between phases from any pair of wavelengths to yield the time difference between the pulses.

Figure 3A:
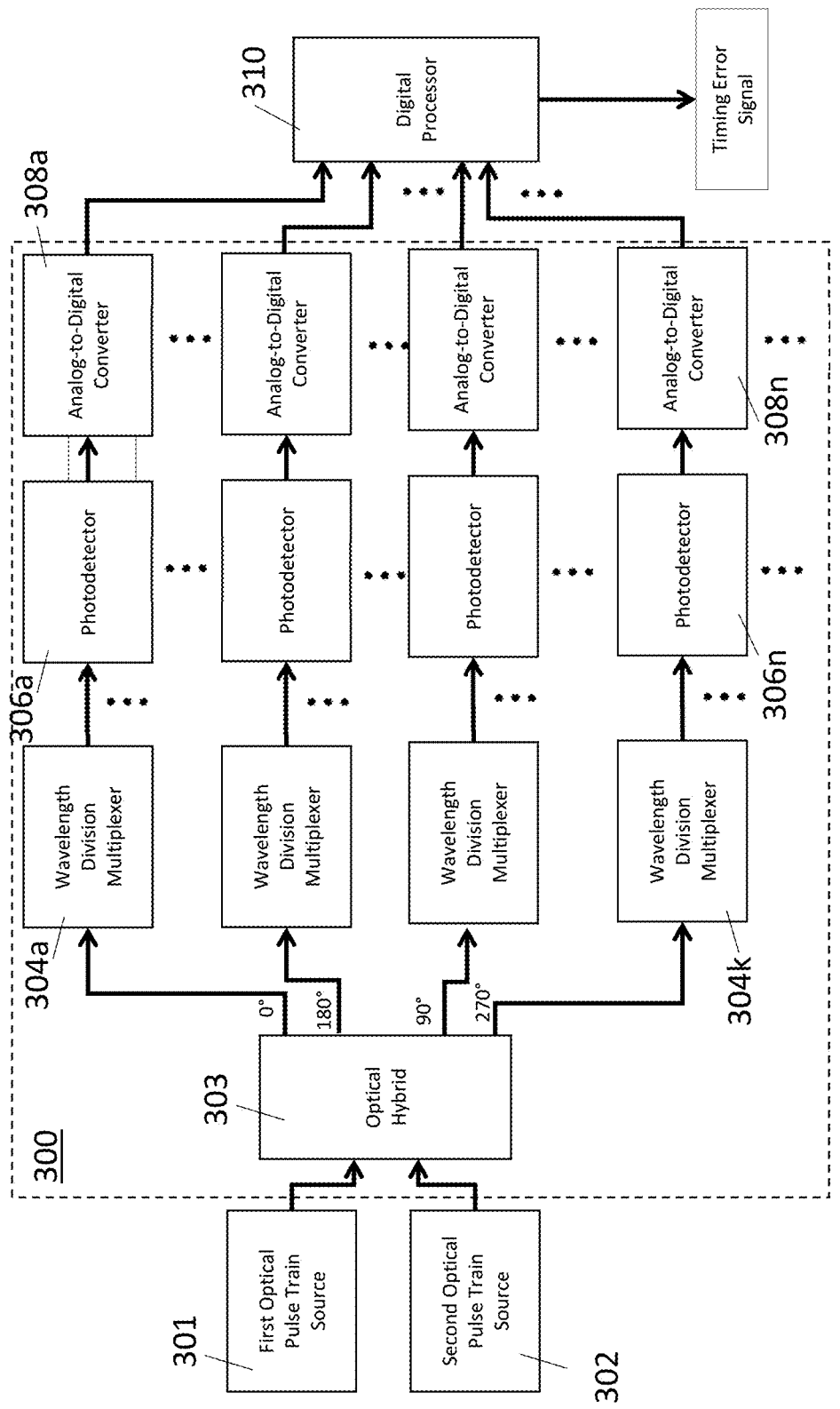
FIG. 3A illustrates another timing measurement apparatus in accordance with the present technology.

FIG. 3A illustrates another example timing measurement apparatus 300 in accordance with the present technology. The apparatus 300 accepts two inputs 301, 302 into an optical hybrid 303 device. The optical hybrid 303 generates four outputs whose phases are shifted 90 degrees from each other (e.g., 0°, 90°, 180°, and 270° outputs). The four outputs of the optical hybrid 303 are fed into wavelength division multiplexers 304a to 304k. The outputs of each wavelength division multiplexer 304a to 304k (e.g., $v_{high}$ and $v_{low}$) are fed into photodetectors 306a to 306n to convert optical signals into radio-frequency (RF) signals. The RF outputs from the photodetectors 306a to 306n are digitized using analog-to-digital converters 308a to 308n.

The digital signals output from the timing measurement apparatus are fed into a digital processor 310. Similar to the embodiment shown in FIG. 2, some of the apparatus components, such as the digital processor, can be a part of the timing measurement apparatus or a separate component implemented outside of the timing measurement apparatus. The digital processor 310 calculates the difference between the 0° and 180° pulses from each frequency band as well as the 90° and 270° outputs from each frequency band. The two differences are fed as inputs into the pulse pair phase difference algorithm.

Figure 3B:
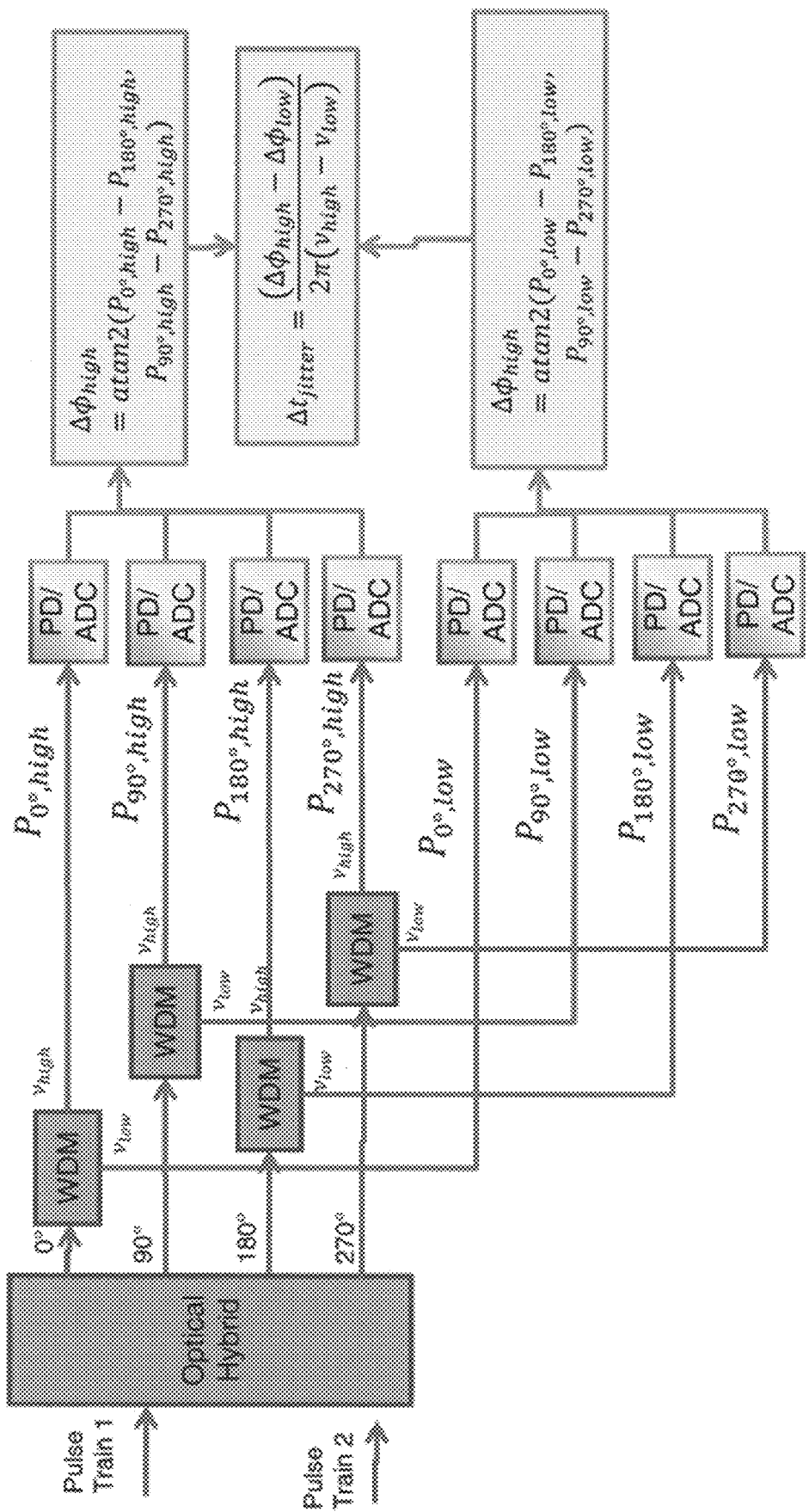
FIG. 3B illustrates another representation of a timing measurement apparatus in accordance with an example embodiment.

FIG. 3B illustrates another representation of the timing measurement apparatus in accordance with the present technology to provide better understanding of the phase offset calculations. The phase offset $\Delta\varnothing_{high}$ can be obtained as:

$$\Delta\varnothing_{high} = \alpha \tan 2(P_{0°,high} - P_{180°,high}, P_{90°,high} - P_{270°,high}) \qquad \text{Eq. (6)}$$

The phase offset $\Delta\varnothing_{low}$ can be obtained as:

$$\Delta\varnothing_{low} = \alpha \tan 2(P_{0°,low} - P_{180°,low}, P_{90°,low} - P_{270°,low}) \qquad \text{Eq. (7)}$$

The phase offset caused by timing error (e.g., jitter) can then be determined according to Eq. (3).

Figure 4A:
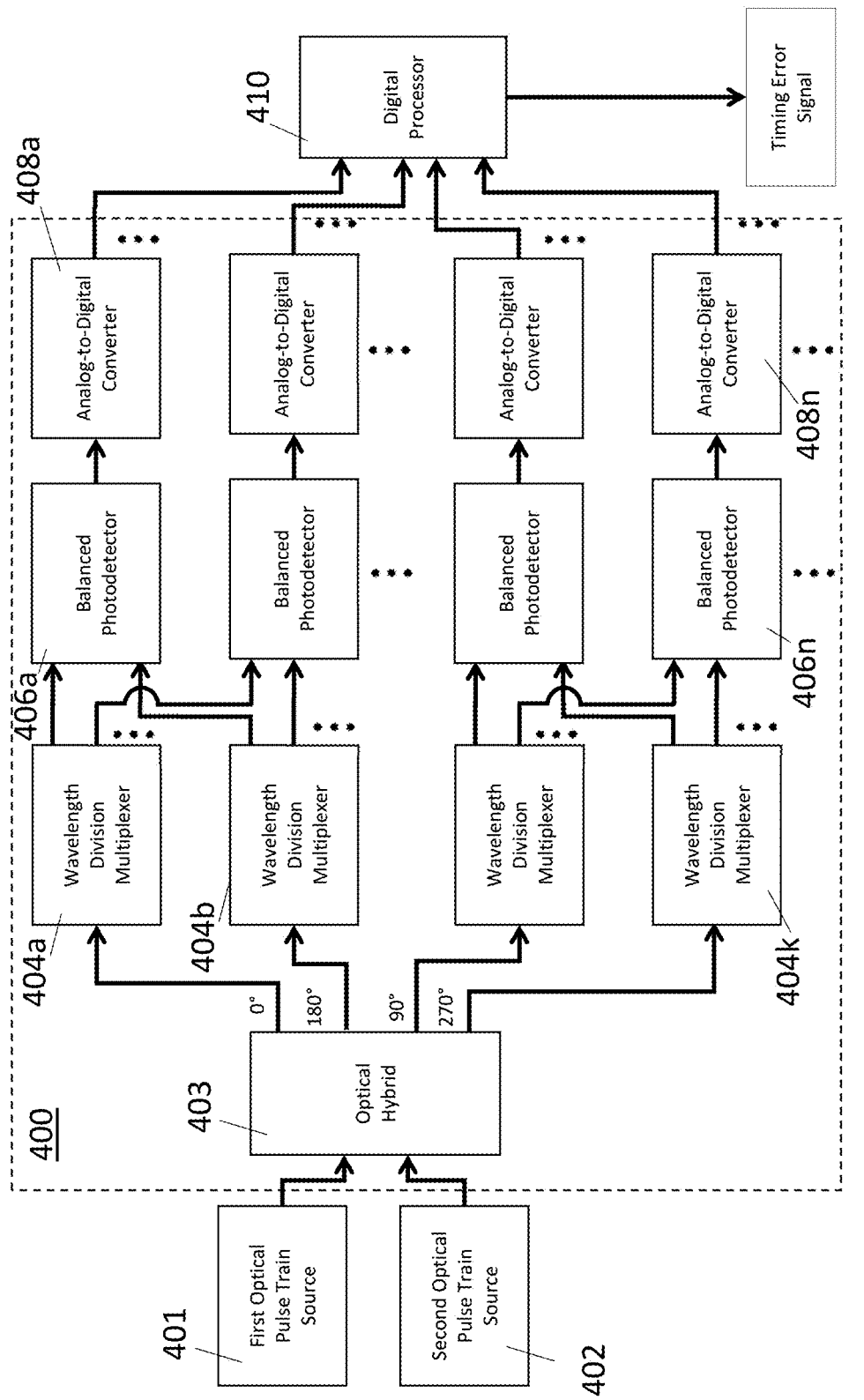
FIG. 4A illustrates another example timing measurement apparatus in accordance with the present technology.

FIG. 4A illustrates another example timing measurement apparatus 400 in accordance with the present technology. The apparatus 400 accepts two inputs 401, 402 into an optical hybrid device 403. The optical hybrid 403 generates four outputs whose phases are shifted 90 degrees from each other (e.g., 0°, 90°, 180°, and 270° outputs). The 0° and 180° pulses from the optical hybrid are directed to two WDMs 404a, 404b. Outputs from the same frequency band of the 0° and 180° pulses are directed into one set of balanced photodetectors 406a to 406n. Likewise, outputs from the same frequency band of the 90° and 270° pulses are directed into another set of balanced photodetectors.

Figure 4B:
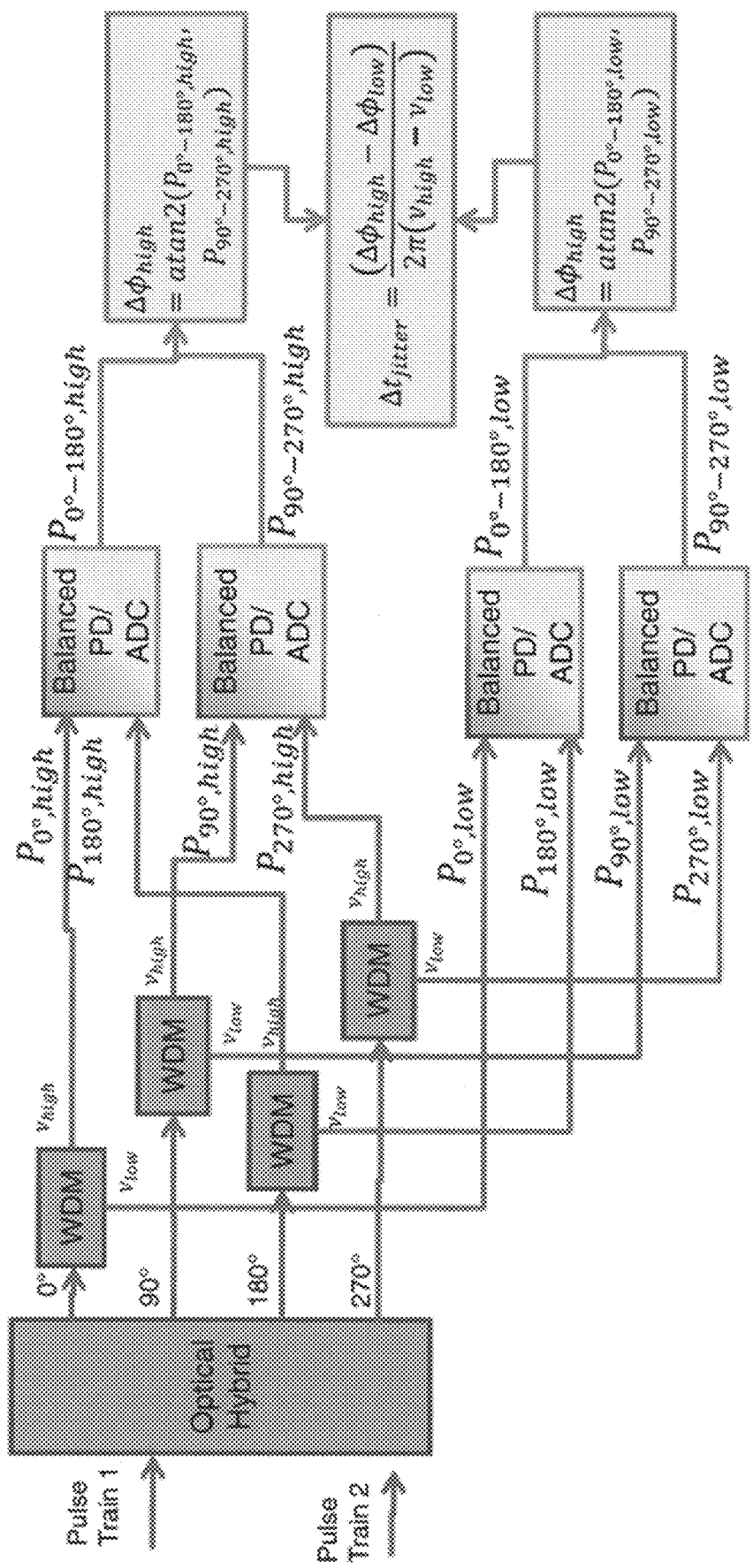
FIG. 4B illustrates another representation of a timing measurement apparatus in accordance with the present technology.

FIG. 4B illustrates another representation of the timing measurement apparatus in accordance with the present technology. The phase offset $\Delta\varnothing_{high}$ can be obtained as:

$$\Delta\varnothing_{high} = \alpha \tan 2(P_{0°-180°,high}, P_{90°-270°,high}) \qquad \text{Eq. (8)}$$

The phase offset $\Delta\varnothing_{low}$ can be obtained as:

$$\Delta\varnothing = \alpha \tan 2(P_{0°-180°,low}, P_{90°-270°,low}) \qquad \text{Eq. (9)}$$

The phase offset caused by timing error (e.g., jitter) can then be determined according to Eq. (3).

Figure 5:
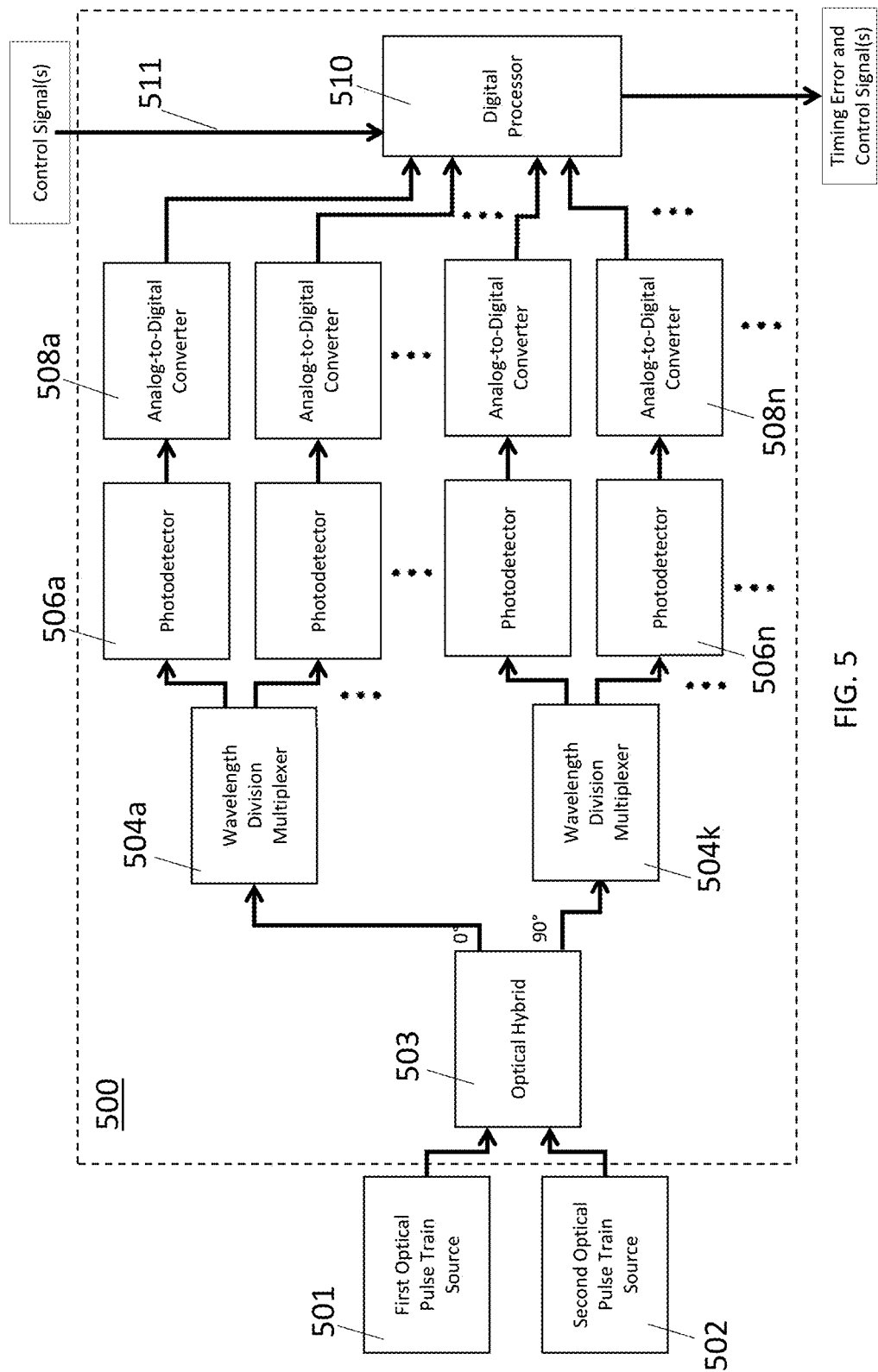
FIG. 5 illustrates yet another example timing measurement apparatus in accordance with the present technology.

FIG. 5 illustrates yet another example timing measurement apparatus 500 in accordance with the present technology. In this embodiment, the timing measurement apparatus 500 is similar to the apparatus 200 in FIG. 5 but is illustrated as including the digital processor 510 as part of the apparatus. In particular, in FIG. 5, two optical inputs 501, 503 are provided to an optical hybrid 503. The outputs of the optical hybrid 503 are provided to the wavelength division multiplexers 504a to 504k; the outputs of the wavelength division multiplexers 504a to 504k are provided to the photodetectors 506a to 506n. The ADCs 508a to 506n receive the electrical signals from the photodetectors 506a to 506n and provide the digitized signals to the digital processor 510. In addition, the digital processor 510 receives not only the digital signals from the analog-to-digital converters 508a to 508n but also one or more control signals 511. The one or more control signals 511 can be used to account for timing offsets or timing error compensation, can be signals associated with environmental and external factors, such as temperature, vibrations or other channel information. The digital processor 510 can use such control signal to correct or compensate for such timing or environmental factors.

Figure 6:
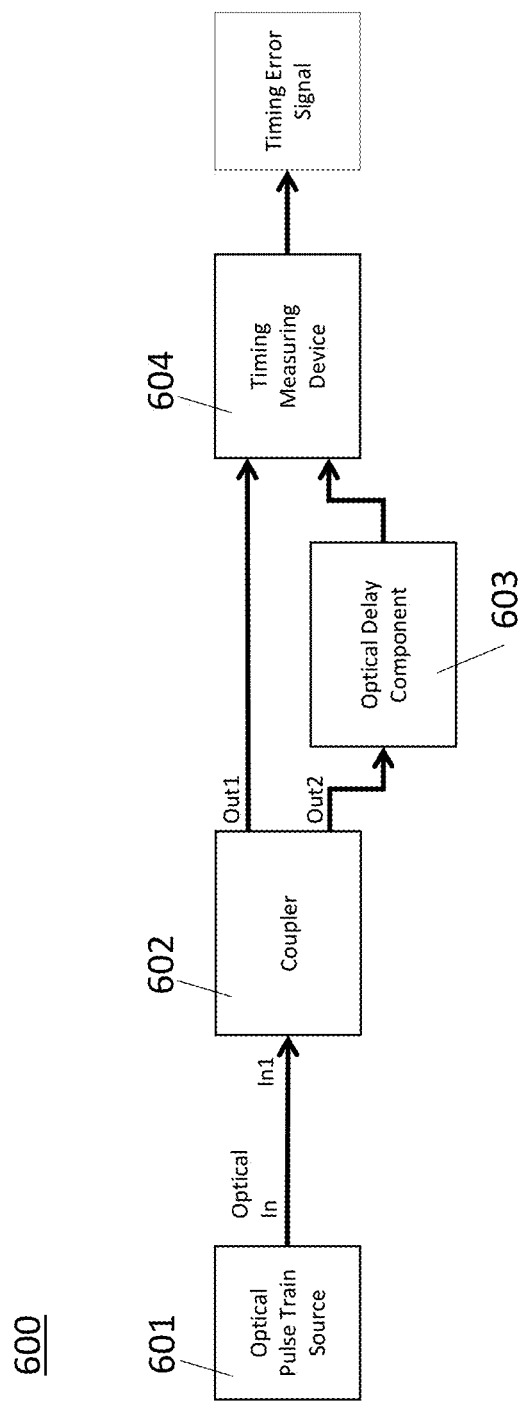
FIG. 6 illustrates an example architecture of a timing measurement system in accordance with the present technology.

FIG. 6 illustrates an example architecture of a timing measurement system 600 in accordance with the present technology. As shown in FIG. 6, a pulse source generates an optical pulse train 601. The optical pulse train 601 is then provided to a coupler 602. The optical coupler 602 is a device that splits the input optical wave (or combines two input optical waves from two ports) into two output optical waves at ports Out1 and Out2, each with a fraction of the power of the input(s). The coupler 602 can maintain the polarization state of the input for optimal operation. In this embodiment, one of the outputs of the coupler 602 is directed into a timing measurement device 604 (such as those shown in example configurations of FIGS. 2 to 5) directly. The other output of the coupler 602 is fed into the timing measurement device 604 via an optical delay component 603. The optical delay component 603 can be a polarization maintaining optical fiber, such as an integrated photonic optical delay line (e.g. silicon photonic, planar lightwave circuit, InP, GaAs, etc.). The length of the optical delay can be chosen to overlap pulses that are $N \geq 1$ periods apart.

Figure 7:
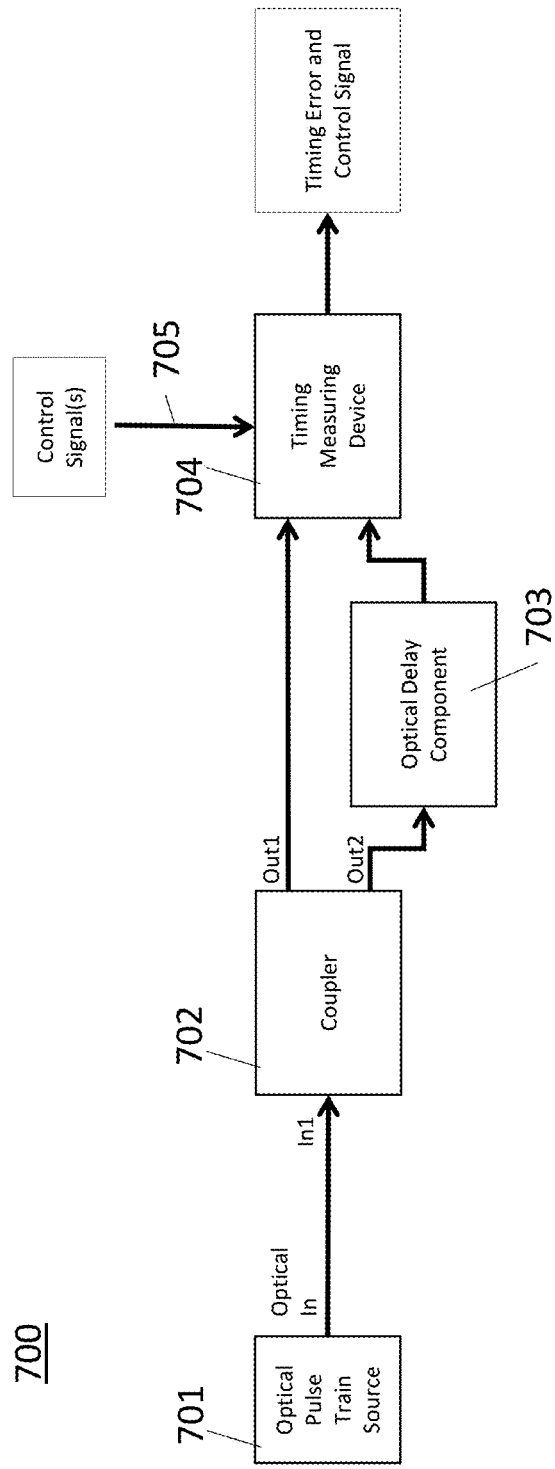
FIG. 7 illustrates another example architecture of a timing measurement system in accordance with the present technology.

FIG. 7 illustrates another example architecture of a timing measurement system 700 in accordance with the present technology. In this embodiment, similar to the configuration in FIG. 6, an optical pulse train 701 from an optical source is provide to the optical coupler 702; one output of the coupler 702 is directly provided to the timing measurement device 704, while the other output of the coupler is provided to an optical delay component 703, whose output is provided to the timing measurement device 704. The timing measurement system 700 further accepts one or more control signals 705 so that a timing offset can be added to the timing error signal. In both embodiments shown in FIG. 6 and FIG. 7, the optical hybrid, which is a part of the timing measurement device 604, 704, eliminates the need for a phase locked loop and repetition rate tunable laser as used in some of the conventional techniques. The timing error information can be recorded in the digital form so that it can be used for compensation or combined with other subsequent processing. In some embodiments, the average peak of the pulses from the photodetectors can be aligned to the sample time of the digitizer, whose sample rate is equal to the pulse repetition rate.

Figure 8:
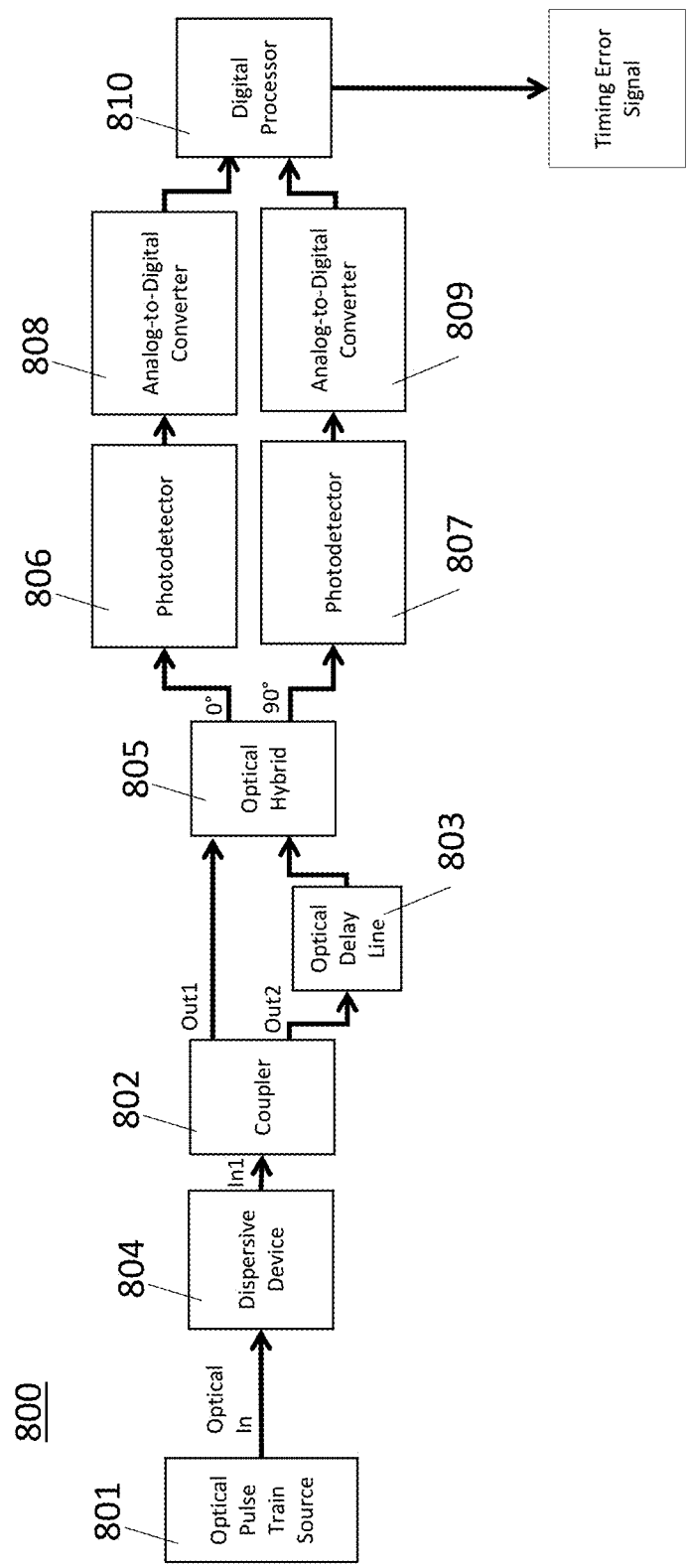
FIG. 8 illustrates another example architecture of a timing measurement system in accordance with the present technology.

FIG. 8 illustrates another example architecture of a timing measurement system 800 in accordance with the present technology. This embodiment can be implemented when the digitizer sample rate is higher than the pulse repetition rate, and the multiple samples on each pulse correspond to the multiple optical frequencies of the pulse. The timing measurement system 800 includes a dispersive device 804 that receives the optical pulse train 801 and separates each pulse's optical frequencies temporally that are provided to the coupler 802. The system 800 then aligns the average peak of the pulses from the photodetectors 806, 807 to the sample time of the digitizers. The outputs from the optical hybrid 802 are fed directly to the photodetectors 806, 807, thereby removing the need for additional photodetectors and digitizers. The analog to digital converters 808, 809 digitize the analog signals produced by the photodetectors 806, 807. Alternatively, multiple dispersive devices can be used to connect the outputs from the optical hybrid to the photodetectors. The pulses are temporally aligned either in the analog domain (e.g., using optical delay lines) or in the digital processor with a shift (e.g., using circshift). The digital processor 810 then processes the samples corresponding to the same pulse. The phase offset $\Delta\varnothing(n,m)$ as a function of pulse number n and sample point within a single pulse m can be obtained as:

$$\Delta\varnothing(n,m)=\alpha\tan 2(P_{0°}(n,m),P_{90°}(n,m)) \quad \text{Eq. (10)}$$

In some embodiments, a line can be fit to the independent variable optical frequency ω, which is related to sample number m by the frequency-time mapping, and dependent variable $\Delta\varnothing(n,m)$, for a single pulse, yielding an intercept and slope for each pulse. The timing error can be deemed as being proportional to the slope of this line.

Figure 9:
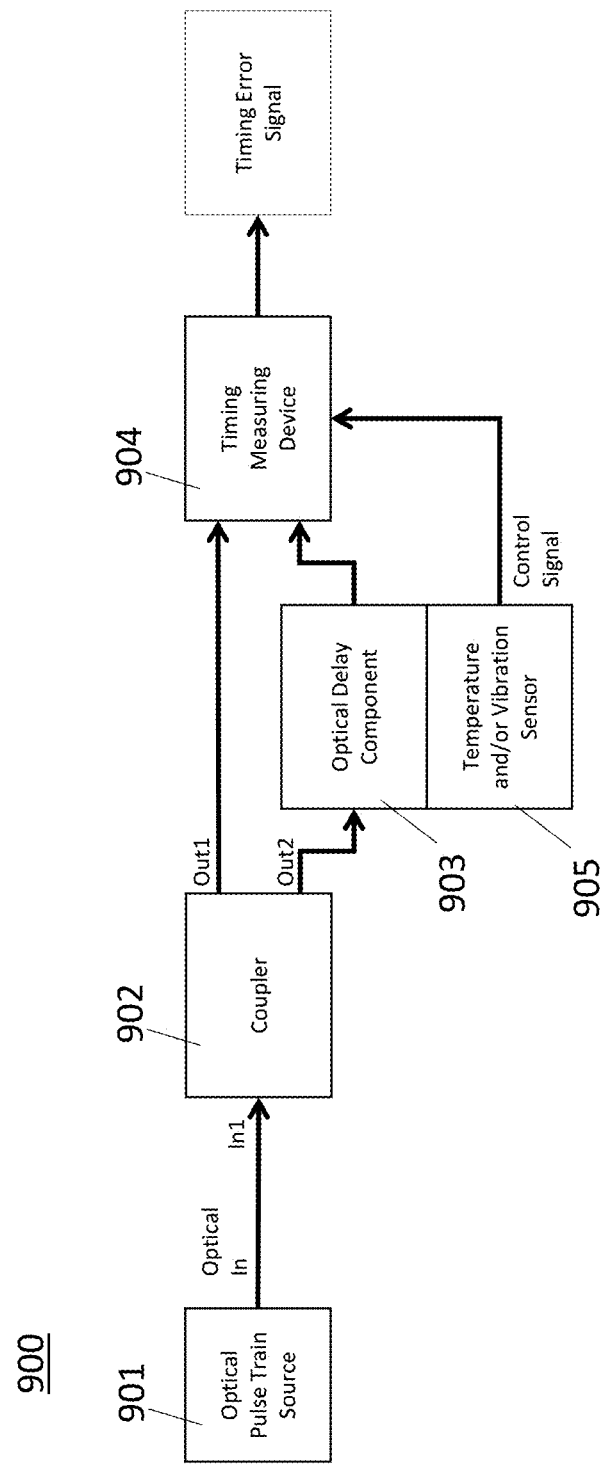
FIG. 9 illustrates an example architecture of a timing measurement system that reduces environmental dependency in accordance with the present technology.

Typically, optical delay lines have temperature and vibration dependency. FIG. 9 illustrates an example architecture of a timing measurement system 900 that reduces environmental dependency of the timing measurement in accordance with the present technology. Similar to the configuration of FIG. 6, the optical pulse train 901 is provided to the coupler 902. One output of the coupler is provided to the timing measurement device 904, and the other output of the coupler 902 is provided to the optical delay component 903. The timing measurement system 900 adds a temperature and/or vibration sensor 905 onto the optical delay component 903 so that information from the sensor 905 can be used to digitally remove or reduce optical delay variations caused by environmental fluctuations on the timing error measurement.

Figure 10:
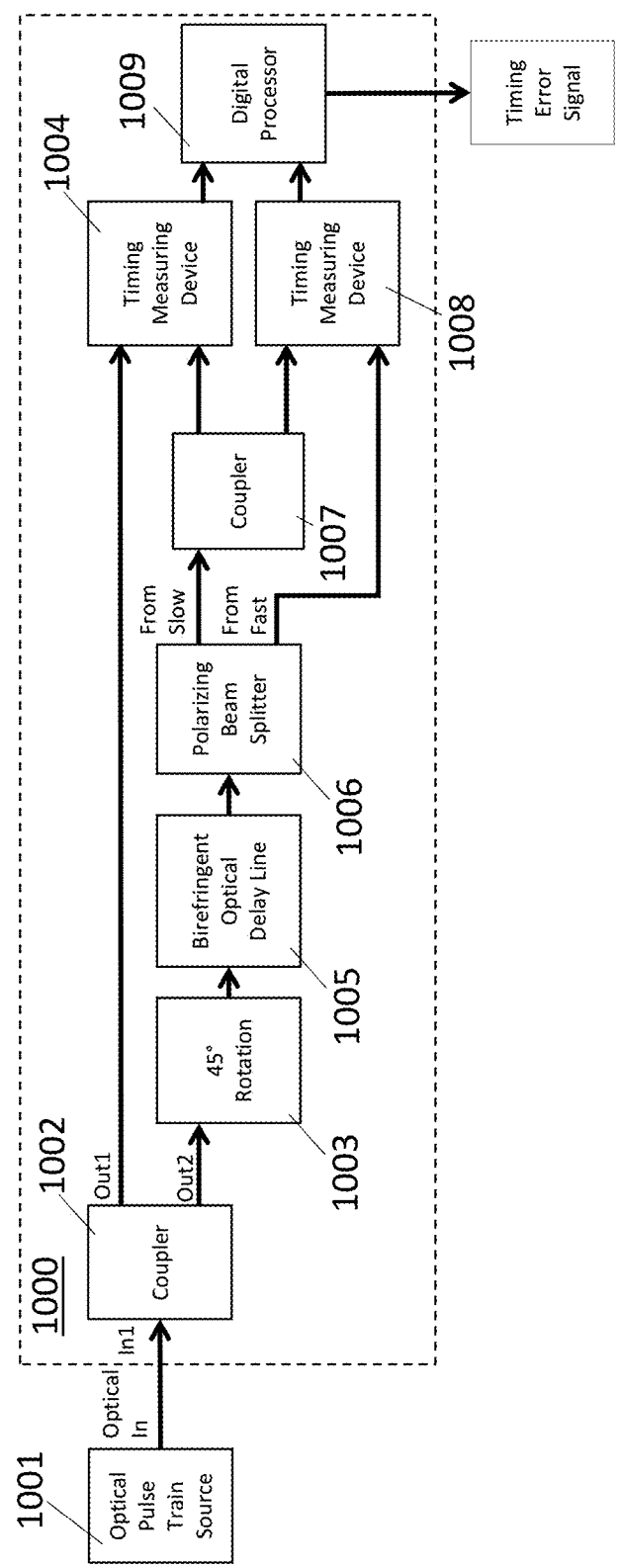
FIG. 10 illustrates another example architecture of a timing measurement system in accordance with the present technology.

FIG. 10 illustrates another example architecture of a timing measurement system 1000 in accordance with the present technology. In this embodiment, the optical pulse train 1001 is coupled into a first coupler 1002 to create two copies: Out1 and Out2. The first copy, Out1, is transmitted directly into a first timing measurement device 1004. The second copy, Out2, is fed into both polarizations of a birefringent optical delay line that maintains polarization. In some embodiments, the polarizations are created by a polarization rotator 1003, such as a 45-degree splice that sends linearly polarized light half into each polarization, that is placed between the coupler 1002 and the birefringent optical delay line 1005. The optical signal from the optical delay line 1005 is then fed into a polarizing beam splitter 1006 that separates light that travels through the slow and fast axes of the birefringent optical delay line. Light from one axis (e.g. slow) is sent to a second coupler 1007. One output of the second coupler 1007 is fed into the first timing measurement device 1004, whose other input receives the first copy of the first optical pulse train Out1. The other output of the second coupler 1007 and light from the other axis (e.g. fast) from the beam splitter 1006 are fed into a second timing measurement device 1008. The digital processor 1009 uses the information obtained from the timing measurement devices 1004, 1008 to produce the timing error signal.

The first timing error signal $t_{TMD1}(n)$ as a function of measurement number n from the first timing measurement device 1004 is between pulses that are many pulse periods (M) apart, and the delay is proportional to temperature changes $\Delta T(n)$ that vary with measurement number n and with coefficient $K_1$ that is independent of n due to changes in the delay line's length and group index from temperature changes. The second timing error $t_{TMD2}(n)$ from the second timing measurement device 1008 is between pulses that are a few pulse periods (N) apart, and the delay is proportional to a temperature change $\Delta T(n)$ with coefficient $K_2$ that is independent of n due to changes in the delay line's length and birefringence. Both signals are sensitive and linearly proportional to temperature, yielding a linear system with two equations (relationship between temperature change and single or dual polarization delay) and two unknowns (temperature change and delay between each far apart pulse pair).

$$t_{TMD1}(n)=M\Delta t(n)+t_1+K_1\Delta T(n) \quad \text{Eq. (11)}$$

$$t_{TMD2}(n)=N\Delta t(n)+t_2+K_2\Delta T(n) \quad \text{Eq. (12)}$$

In the above equations, $\Delta t(n)$ is the timing difference between adjacent pulses, averaged over M pulses; $t_1$ and $t_2$ can be freely chosen, e.g., such that for the first measurement point n=1, $\Delta t(1)=0$ and $\Delta T(1)=0$ for both equations; regardless, $t_1$ and $t_2$ do not vary with n. As long as the ratio of the timing changes to temperature is different from the ratio of number of pulse periods apart (which is the case for standard polarization maintaining fiber), the system of equations Eq. (11) and Eq. (12) is invertible. Solving that system yields the delay between pulses from the optical pulse train.

Figure 11:
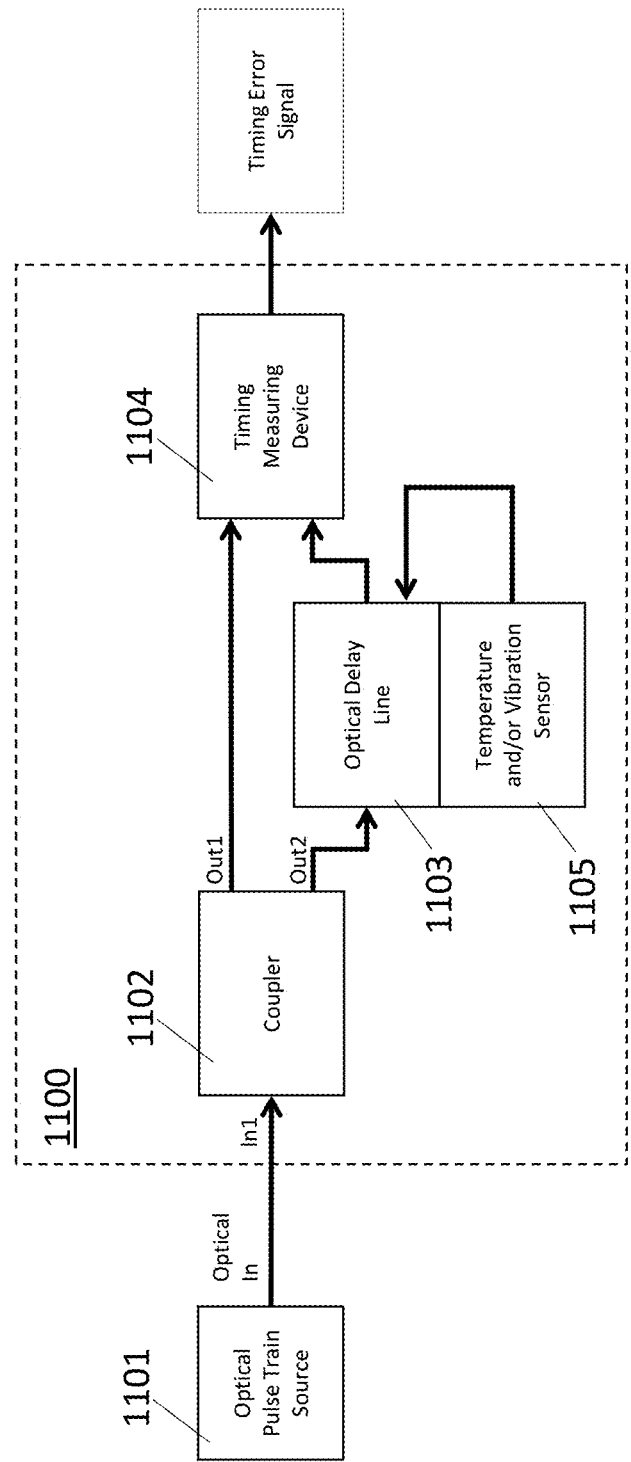
FIG. 11 illustrates another example architecture of a timing measurement system in accordance with the present technology.

FIG. 11 illustrates another example architecture of a timing measurement system 1100 in accordance with the present technology. In this embodiment, the optical pulse train 1101 is receive by the coupler 1102; one output of the coupler is provided to the timing measurement device 1104 and the other output of the coupler 1102 is provided to the optical delay line 1103. The timing measurement system 1100 can stabilizes the optical delay line 1103 using a temperature and/or vibration sensor 1105. Information from the temperature and/or vibration sensor 1105 can create a compensational signal along the optical delay line 1103. The compensation signal can be sent to a delay line adjustment device, e.g. a fiber stretcher, a heater, or a tunable optical delay line placed before or after the optical delay line 1103 to perform the stabilization.

Figure 12:
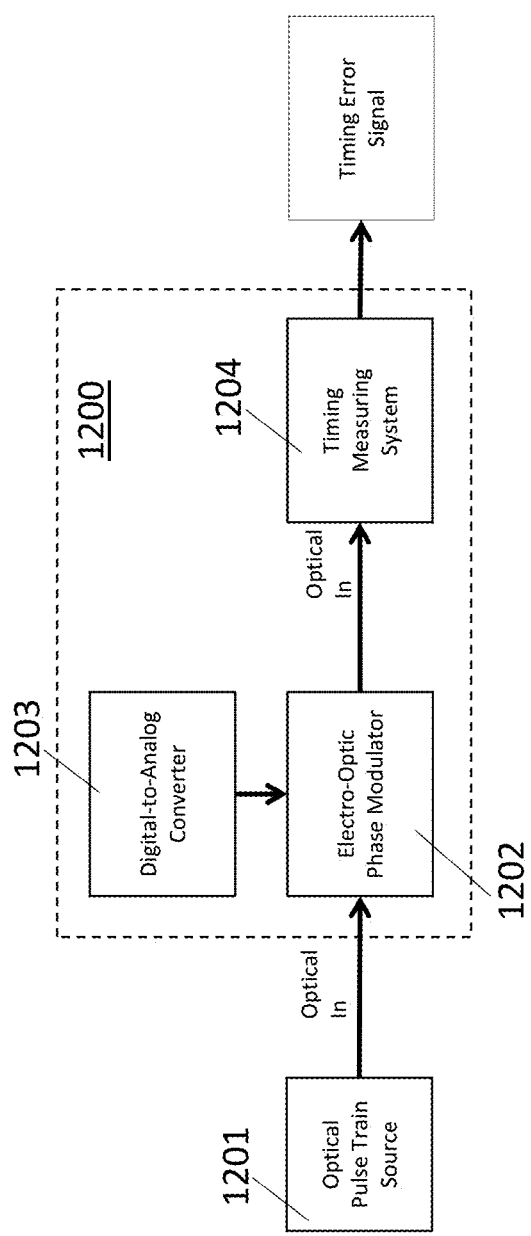
FIG. 12 illustrates an example architecture of a real-time calibration system in accordance with the present technology.

FIG. 12 illustrates an example architecture of a real-time calibration system 1200 in accordance with the present technology. The calibration system 1200 uses a digital-to-analog converter 1203 and a calibrated tunable delay line. The digital processor included in the timing measurement device 1204 can adopt a calibration algorithm to determine calibration coefficients to enable real-time calibration. The digital-to-analog converter 1203 sends a calibration signal to the calibrated tunable delay line, and the timing measurement device records the digital inputs. For example, the calibration signal can be a rectangular wave, with period given by the laser period or an integer fraction of that, multiplied by a ramp that ranges from 0% to 100%. The calibration signal can cause timing differences between pulses to be distributed uniformly across the range of possible calibration values. In some embodiments, for fast calibration, the calibrated tunable delay line can an electro-optic phase modulator 1202 with known $V_\pi$, and the calibration signal can be used immediately before and/or after one or more acquisitions in the field.

Figure 13:
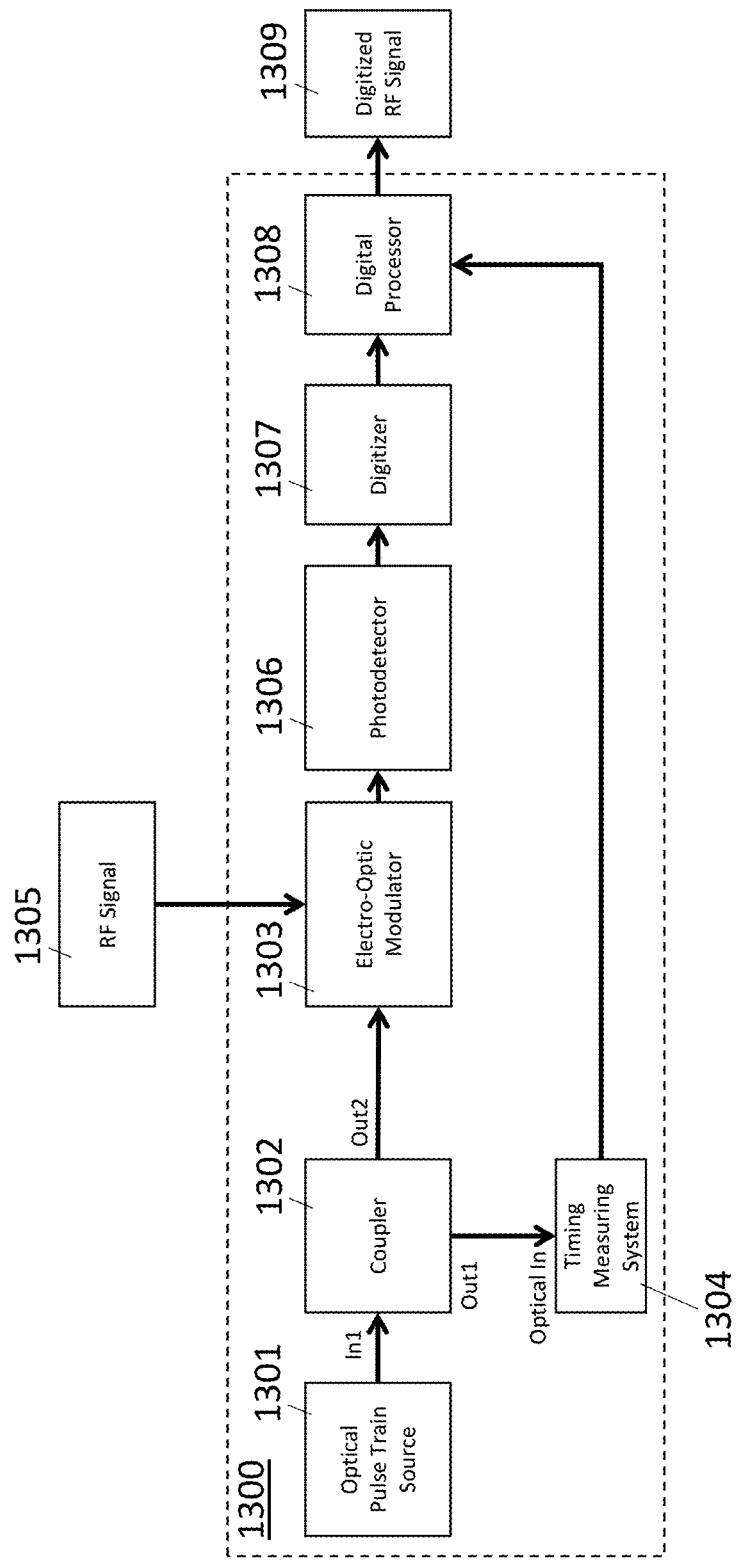
FIG. 13 illustrates an example architecture of an error-compensated Photonic Analog-to-Digital converter that uses a timing measurement device in accordance with the present technology.

FIG. 13 illustrates an example architecture of an error-compensated photonic Analog-to-Digital converter 1300 that uses a timing measurement device in accordance with the present technology. When the timing error of the optical pulse train source in the photonic analog-to-digital converter is larger than the measurement noise of the timing measurement device, the negative impact of the timing errors on the RF signal measurement process can be compensated in a digital processor. In this particular embodiment, the converter is arranged such that: (1) an optical pulse train 1301 source is directed into a coupler 1032; (2) one output of the coupler 1302 is fed into a timing measurement device 1304, generating a timing error signal; (3) the second output of the coupler 1302 is fed into an electro-optic intensity modulator 1303, generating an intensity modulated optical pulse train in accordance with the RF signal 1305; (4) the intensity modulated optical pulse train is directed to a photodetector 1306 to form an intensity modulated RF pulse train; (5) an analog-to-digital converter 1307 converts the intensity modulated RF pulse train into intensity modulated digital samples; (6) the digital processor 1308 takes the intensity modulated digital samples and timing error signal, and compensates the timing error on the intensity modulated digital samples, thereby obtaining the electro-optic intensity modulator transfer function to generate a digitized RF signal 1309.

In all of the embodiments described herein, the digital processor can use a calibration algorithm that removes nonidealities such as: unequal modulation amplitudes between 0 degree/90 degree/other channels and/or phase differences between channels besides 90 degrees. In addition, 0° and 90° pulses (as well as the 180° and 270° pulses) are ideally proportional to the sine and cosine of the modulated phase at the time of sampling. Thus, when plotted on the axes of a graph, the 0° and 90° pulses (similarly, the 180° and 270° pulses) from all possible modulated phases should form a circle. Any deviation from a true circle is a result of distortion in the system. To remove such distortions, the digital processor can sample the received data to fit an ellipse to the shape (e.g., using a least-squares fit). From the ellipse coefficients, the digital processor can calculate coefficients to transform that ellipse to a circle to removes biases and/or offsets in the components such as the modulators, digitizers, etc.

One aspect of the disclosed embodiments relates to a timing measurement apparatus that includes an optical hybrid configured to receive two optical pulse trains as inputs and produce two or more optical outputs that are each phase shifted with respect to one another. The timing measurement apparatus further includes two or more optical filters each coupled to the optical hybrid to receive an output from the optical hybrid, the two or more optical filters configured to produce multiple pulse signals with distinctive frequency bands. The timing measurement apparatus also includes one or more photodetectors positioned to receive and convert each of the multiple optical signals produced by the two or more optical filters to an associated electrical signal. The above timing measurement apparatus additionally includes one or more analog-to-digital converters coupled to the one or more photodetectors to convert the plurality of electrical signals into a plurality of digital signals corresponding to the outputs of the two or more optical filters, where processing of the plurality of digital signals enables a determination of a timing error associated with the two optical pulse trains based on a computed phase difference between a first frequency band signal and a second frequency band signal and a computed frequency difference between the first frequency band signal and the second frequency band.

In one example embodiment, the two or more optical outputs include two optical outputs that are phase shifted by 0 and 90 degrees, respectively. In another example embodiment, the two or more optical outputs include four optical outputs that are each phase shifted with respect to one another. In yet another example embodiment, the four optical outputs are phase shifted by 0, 90, 180 and 270 degrees, respectively. According to another example embodiment, the one or more photodetectors include one or more balanced photodetectors, each configured to receive inputs from two of the two or more optical outputs, wherein the two optical outputs feeding each balanced photodetector have the same frequency band. In one example embodiment, a first of the one or more balanced photodetectors is configured to receive a first input that is phase shifted by 0 degree and a second input that is phase shifted by 180 degrees, and wherein a second of the one or more balanced photodetectors is configured to receive a third input that is phase shifted by 90 degree and a fourth input that is phase shifted by 270 degrees.

In another example embodiment, the timing measurement system a digital processor configured to determine timing information associated with the two optical pulse trains based on the plurality of digital signals. In yet another example embodiment, the digital processor is configured to receive one or more control signals and to adjust the determination of the timing error according to the one or more control signals.

According to an example embodiment, the timing measurement apparatus is implemented as part of a timing measurement system, where the timing measurement system includes a coupler configured to receive an input optical pulse train and to produce a first pulse train that is provided to the timing measurement apparatus as one of the two optical pulse trains, the coupler further configured to produce a second pulse train. The timing measurement system further includes an optical delay component coupled to the coupler to allow transmission of the second pulse train to the timing measurement apparatus as another of the two optical pulse trains. In another example embodiment, the optical delay component allows an interference to occur between the first and the second pulse trains. In yet another example embodiment, the timing measurement system further comprises a sensor that is configured to produce the one or more control signals to a delay line adjustment component to stabilize a length of the optical delay component. In still another example embodiment, the timing measurement apparatus is further configured to receive one or more control signals to enable further adjustments to the determination of the timing error. In one example embodiment, the timing measurement system further comprises a sensor that is configured to produce the one or more control signals for provision to the timing measurement apparatus to enable additional adjustments to the determination of the timing error. In an example embodiment, the sensor includes a temperature or vibration sensor.

In another example embodiment, the timing measurement apparatus is a first timing measurement apparatus that is implemented as part of a timing measurement system, and the timing measurement system further includes a first coupler configured to receive an input optical pulse train and produce a first optical pulse train that is provided to the first timing measurement apparatus as one of the two optical pulse trains, the coupler further configured to produce a second optical pulse train. The timing measurement system also includes an optical rotator coupled to the first coupler to receive the second optical pulse train, an optical delay component coupled to the optical rotator, a polarizing beam splitter coupled to the optical rotator via the optical delay component to receive and separate an optical pulse train that is output from the optical delay component into a slow pulse train and a fast pulse train, a second coupler coupled to the polarizing beam splitter to receive the slow pulse train and produce a first intermediate pulse train and a second intermediate pulse train, wherein the first intermediate pulse train is directed to the timing measurement apparatus as another of the two optical pulse trains, and a second timing measurement apparatus coupled to the second coupler and to the polarizing beam splitter to receive the second intermediate pulse train and the fast pulse train as two optical pulse trains, wherein computation of timing error information associated with the input pulse train is enabled based on processing of signals representative of outputs of the first timing measurement apparatus and the second timing measurement apparatus.

In another example embodiment, the timing measurement apparatus is a first timing measurement apparatus that is implemented as part of a timing measurement system, and the timing measurement system further includes one or more couplers, a polarization rotator, an optical delay component and a polarizing beam splitter to produce a slow and a fast pulse train based on an input optical pulse train; and a second timing measurement apparatus, wherein the first timing measurement apparatus is configured to receive the input optical pulse train and the slow pulse train, and second timing measurement apparatus is configured to receive the slow pulse train and the fast pulse train to enable a determination of a timing error in the input optical pulse train.

In yet another example embodiment, the optical delay component is a birefringent optical delay line. In still another example embodiment, the timing measurement system is implemented as part of a real-time calibration system, where the real-time calibration system includes a digital-to-analog converter configured to convert a digital signal to an electrical analog signal, and an electro-optic (EO) modulator coupled to the digital-to-analog converter to receive the electrical analog signal, the EO modulator further configured to receive a train of pulses and to produce a phase modulated signal based on the received train of pulse and the electrical analog signal, wherein the timing measurement system is coupled to the EO modulator to receive the phase modulated signal as the input pulse train.

In one example embodiment, the timing measurement system is implemented as part of a photonic analog-to-digital converter, where the photonic analog-to-digital converter includes a second coupler configured to receive a train of optical pulses, wherein the timing measurement system is coupled to a first output of the second coupler to receive the train of optical pulses from the first output of the second coupler, and wherein the second coupler further configured to produce a separate optical pulse train at a second output thereof. The photonic analog-to-digital converter further includes an electro-optic (EO) modulator coupled to the second output of the second coupler to receive the separate optical pulse train, the EO modulator further configured to receive a radio-frequency (RF) signal and to produce a modulated optical signal based on the separate optical pulse train and the RF signal. The photonic analog-to-digital converter also includes a photodetector coupled to the EO modulator to convert the modulated optical signal into an associated electrical signal, and a digitizer to convert the electrical signals produced by the one or more photodetectors into digital signals. In another example embodiment, the photonic analog-to-digital converter includes a digital processor coupled to the digitizer and to the timing measurement systems to obtain an adjusted digital signal corresponding to the train of optical pulses.

Another aspect of the disclosed embodiments relates to a timing measurement system that includes a dispersive device configured to receive an input optical pulse train and to produce a train of pulses that are spectrally dispersed in time domain, a coupler coupled to the dispersive device to receive the train of spectrally dispersed pulses and to produce two outputs, an optical hybrid coupled to a first output of the coupler to receive a first pulse train from the coupler, an optical delay component coupled to a second output of the coupler to provide a second pulse train from the coupler to the optical hybrid, wherein the optical hybrid is configured to produce two or more optical outputs that are each phase shifted with respect to one another based on the first pulse train and the second pulse train, one or more photodetectors coupled to the optical hybrid to convert each of the two or more optical outputs into an associated electrical signal, and one or more analog-to-digital converters coupled to the one or more photodetectors to convert the electrical signals into digital signals, wherein processing of the digital signals enables a determination of timing information of the input optical pulse train and adjustment of the digital signals according to the timing information.

At least parts of the disclosed embodiments (e.g., the digital processor) can be implemented in digital electronic circuitry, or in computer software, firmware, or hardware. For example, electronic circuits can be used to control the operation of the detector arrays and/or to process electronic signals that are produced by the detectors. At least some of those embodiments or operations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A timing measurement system, comprising:
    a dispersive device configured to receive an input optical pulse train and to produce a train of pulses that are spectrally dispersed in time domain;
    a coupler coupled to the dispersive device to receive the train of spectrally dispersed pulses and to produce two outputs;
    an optical hybrid coupled to a first output of the coupler to receive a first pulse train from the coupler;
    an optical delay component coupled to a second output of the coupler to provide a second pulse train from the coupler to the optical hybrid, wherein the optical hybrid is configured to produce two or more optical outputs that are each phase shifted with respect to one another based on the first pulse train and the second pulse train;
    one or more photodetectors coupled to the optical hybrid to convert each of the two or more optical outputs into an associated electrical signal; and
    one or more analog-to-digital converters coupled to the one or more photodetectors to convert the electrical signals into digital signals, wherein:
    the one or more analog-to-digital converters are configured to operate at a sample rate that is higher than a repetition rate of the spectrally dispersed pulses,
    multiple samples that are obtained by the one or more analog-to-digital converters for each pulse correspond to multiple optical frequencies of the pulse,
    processing of the digital signals enables a determination of timing information of the input optical pulse train and adjustment of the digital signals according to the timing information, and
    the optical delay component is configured to impart a delay that is larger than or equal to one pulse period.

2. The timing measurement system of claim 1, including a digital processor configured to process the digital signal, wherein the processing includes processing sample values corresponding to the same pulse to determine a phase offset.

3. The timing measurement system of claim 2, wherein the phase offset is a function of pulse number, n, and sample points, m, within a single pulse.

4. The timing measurement system of claim 3, wherein:
    the optical hybrid is configured to produce two optical outputs that are phase shifted with respect to each other by 90 degrees, and
    the phase offset, $\Delta\varnothing(n,m)$, is determined according to the following relationship:

$$\Delta\varnothing(n,m) = \alpha \tan 2(P_{0°}(n,m), P_{90°}(n,m)),$$

wherein $P_{0°}(n,m)$ and $P_{90°}(n,m)$ represent signals associated with the first optical output of the optical hybrid and the second optical output of the optical hybrid.

5. The timing measurement system of claim 2, wherein the determination of the timing information includes determining a timing error based on determination of a slope of a line that relates optical frequency to phase.

6. The timing measurement system of claim 1, wherein the determination of the timing information includes determining a timing error for each pulse.

7. The timing measurement system of claim 1, wherein the optical hybrid is configured to produce two optical outputs that are phase shifted with respect to each other by 90 degrees.

8. The timing measurement system of claim 1, including an optical source that is configured to produce the input optical pulse train provided to the dispersive device.

9. The timing measurement system of claim 1, wherein the optical source that is an optical comb source.

10. The timing measurement system of claim 1, wherein the dispersive device is configured to separate each pulse's optical frequencies temporally.

11. The timing measurement system of claim 1, wherein the timing measurement system is operable to receive the input optical pulse train from an optical pulse source, and to produce the timing information in real-time on a pulse-by-pulse basis.

12. The timing measurement system of claim 1, wherein the two or more optical outputs of the hybrid are directly connected to the one or more photodetectors.

13. The timing measurement system of claim 1, wherein the determination of the timing information includes a determination of timing jitter.

14. A timing measurement system, comprising
a dispersive device configured to receive an input optical pulse train and to produce a train of pulses that are spectrally dispersed in time domain;
a coupler coupled to the dispersive device to receive the train of spectrally dispersed pulses and to produce two outputs;
an optical hybrid coupled to a first output of the coupler to receive a first pulse train from the coupler;
an optical delay component coupled to a second output of the coupler to provide a second pulse train from the coupler to the optical hybrid, wherein the optical hybrid is configured to produce two or more optical outputs that are each phase shifted with respect to one another based on the first pulse train and the second pulse train;
one or more photodetectors coupled to the optical hybrid to convert each of the two or more optical outputs into an associated electrical signal; and
one or more analog-to-digital converters coupled to the one or more photodetectors to convert the electrical signals into digital signals, wherein:
the one or more analog-to-digital converters are configured to operate at a sample rate that is higher than a repetition rate of the spectrally dispersed pulses,
multiple samples that are obtained by the one or more analog-to-digital converters for each pulse correspond to multiple optical frequencies of the pulse,
processing of the digital signals enables a determination of timing information of the input optical pulse train and adjustment of the digital signals according to the timing information, and the two or more optical outputs of the hybrid are coupled to the one or more photodetectors via one or more dispersive elements.

15. The timing measurement system of claim 14, wherein the optical delay component is configured to impart a delay that is larger than or equal to one pulse period.

16. The timing measurement system of claim 14, wherein the timing measurement system is operable to receive the input optical pulse train from an optical pulse source, and to produce the timing information in real-time on a pulse-by-pulse basis.

17. The timing measurement system of claim 14, wherein the determination of the timing information includes determining a timing error for each pulse.

18. A timing measurement system, comprising:
a dispersive device configured to receive an input optical pulse train and to produce a train of pulses that are spectrally dispersed in time domain;
a coupler coupled to the dispersive device to receive the train of spectrally dispersed pulses and to produce two outputs;
an optical hybrid coupled to a first output of the coupler to receive a first pulse train from the coupler;
an optical delay component coupled to a second output of the coupler to provide a second pulse train from the coupler to the optical hybrid, wherein the optical hybrid is configured to produce two or more optical outputs that are each phase shifted with respect to one another based on the first pulse train and the second pulse train;
one or more photodetectors coupled to the optical hybrid to convert each of the two or more optical outputs into an associated electrical signal;
one or more analog-to-digital converters coupled to the one or more photodetectors to convert the electrical signals into digital signals, and
a digital processor configured to process the digital signals, wherein:
the one or more analog-to-digital converters are configured to operate at a sample rate that is higher than a repetition rate of the spectrally dispersed pulses,
multiple samples that are obtained by the one or more analog-to-digital converters for each pulse correspond to multiple optical frequencies of the pulse,
processing of the digital signals enables a determination of timing information of the input optical pulse train and adjustment of the digital signals according to the timing information, the processing includes processing sample values corresponding to the same pulse to determine a phase offset, and the determination of the timing information includes determining a timing error based on determination of a slope of a line that relates optical frequency to phase.

19. The timing measurement system of claim 18, wherein the phase offset is a function of pulse number, n, and sample points, m, within a single pulse.

20. The timing measurement system of claim 18, wherein the two or more optical outputs of the hybrid are coupled to the one or more photodetectors via one or more dispersive elements.

* * * * *